US012618259B1

(12) United States Patent
Lichtman

(10) Patent No.: US 12,618,259 B1
(45) Date of Patent: May 5, 2026

(54) SHELTER

(71) Applicant: Martin Lichtman, Highland Mills, NY (US)

(72) Inventor: Martin Lichtman, Highland Mills, NY (US)

(73) Assignee: Martin Lichtman, Highland Mills, NY (US)

( * ) Notice: Subject to any disclaimer, the term of this patent is extended or adjusted under 35 U.S.C. 154(b) by 709 days.

(21) Appl. No.: 17/407,532

(22) Filed: Aug. 20, 2021

Related U.S. Application Data

(60) Provisional application No. 63/068,508, filed on Aug. 21, 2020, provisional application No. 63/068,369, filed on Aug. 20, 2020.

(51) Int. Cl.

| | |
|---|---|
| ***E04H 15/42*** | (2006.01) |
| ***E04H 9/16*** | (2006.01) |
| ***E04H 15/44*** | (2006.01) |
| *E06B 9/02* | (2006.01) |
| *E06B 9/17* | (2006.01) |

(52) U.S. Cl.
CPC ............... *E04H 15/42* (2013.01); *E04H 9/16* (2013.01); *E04H 15/44* (2013.01); *E06B 9/02* (2013.01); *E06B 9/17* (2013.01); *E06B 9/17007* (2013.01); *E06B 9/1703* (2013.01)

(58) Field of Classification Search
CPC ..... E06B 9/17; E06B 9/02; E06B 9/08; E06B 9/1703; E06B 9/17007; E06B 9/17061; E04H 15/42; E04H 9/16; E04H 15/44
See application file for complete search history.

(56) References Cited

U.S. PATENT DOCUMENTS 4,106,252 A * 8/1978 Rutten .................... E04D 3/366 52/464
4,365,441 A * 12/1982 Davidson .............. E06B 3/4654 49/362
4,444,241 A * 4/1984 Amsler ...................... E06B 9/32 160/172 R
4,894,960 A * 1/1990 Hill ......................... E04F 10/00 52/28
6,173,544 B1 * 1/2001 Spanjers ................. E04B 9/006 52/223.1
7,797,865 B2 * 9/2010 Patel .......................... G09F 9/33 40/564
8,136,306 B2 * 3/2012 Scheps ................ E04B 1/34305 52/72
8,661,747 B2 * 3/2014 Eide ........................ F24S 25/12 126/621
2004/0107655 A1 * 6/2004 Hudoba .................. E06B 9/581 52/202

(Continued)

*Primary Examiner* — Phi D A
(74) *Attorney, Agent, or Firm* — Weiss & Arons LLP

(57) ABSTRACT

Apparatus and methods for shelter are provided. The apparatus and methods may include a channel defining an interior and a slot that extends along a length of the channel in the interior and is configured to receive a retainer that retains a wall against a surface of the channel. The apparatus may include a retainer and a wall. The channel may be supported by a support. The channel may include exterior slots. The channel may define a slot that extends along a length of the channel in the interior and is configured to receive a guide to raise and lower a wall.

88 Claims, 24 Drawing Sheets

(56) References Cited

U.S. PATENT DOCUMENTS

| | | | | |
|---|---|---|---|---|
| 2007/0272367 | A1* | 11/2007 | Gomaa | E06B 9/17046 160/116 |
| 2007/0284051 | A1* | 12/2007 | Grimes | E06B 9/42 160/23.1 |
| 2008/0092330 | A1* | 4/2008 | Haab | E05F 5/003 16/98 |
| 2010/0242364 | A1* | 9/2010 | Magro | E06B 9/74 49/31 |
| 2015/0144276 | A1* | 5/2015 | Lee | E06B 9/171 160/133 |
| 2016/0123076 | A1* | 5/2016 | Kirby | E06B 9/42 160/310 |
| 2016/0308486 | A1* | 10/2016 | Atia | F24S 25/33 |
| 2021/0214999 | A1* | 7/2021 | Magro | E06B 9/68 |

* cited by examiner

SHELTER

CROSS REFERENCE TO OTHER APPLICATIONS

The present application claims the benefit of the filing date of U.S. Provisional Applications Ser. No. 63/068,369 filed on Aug. 20, 2020, and Ser. No. 63/068,508 filed on Aug. 21, 2020, each of which is hereby expressly incorporated by reference in its entirety.

BACKGROUND

Forming a shelter with removable walls and roof may involve multiple pieces. A self-contained apparatus that may include a storable wall may be difficult to manufacture and assemble. However, a self-contained apparatus may be less expensive and more convenient.

Therefore, it would be desirable for apparatus and methods for shelter that may include self-contained apparatus.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

Figure 1:
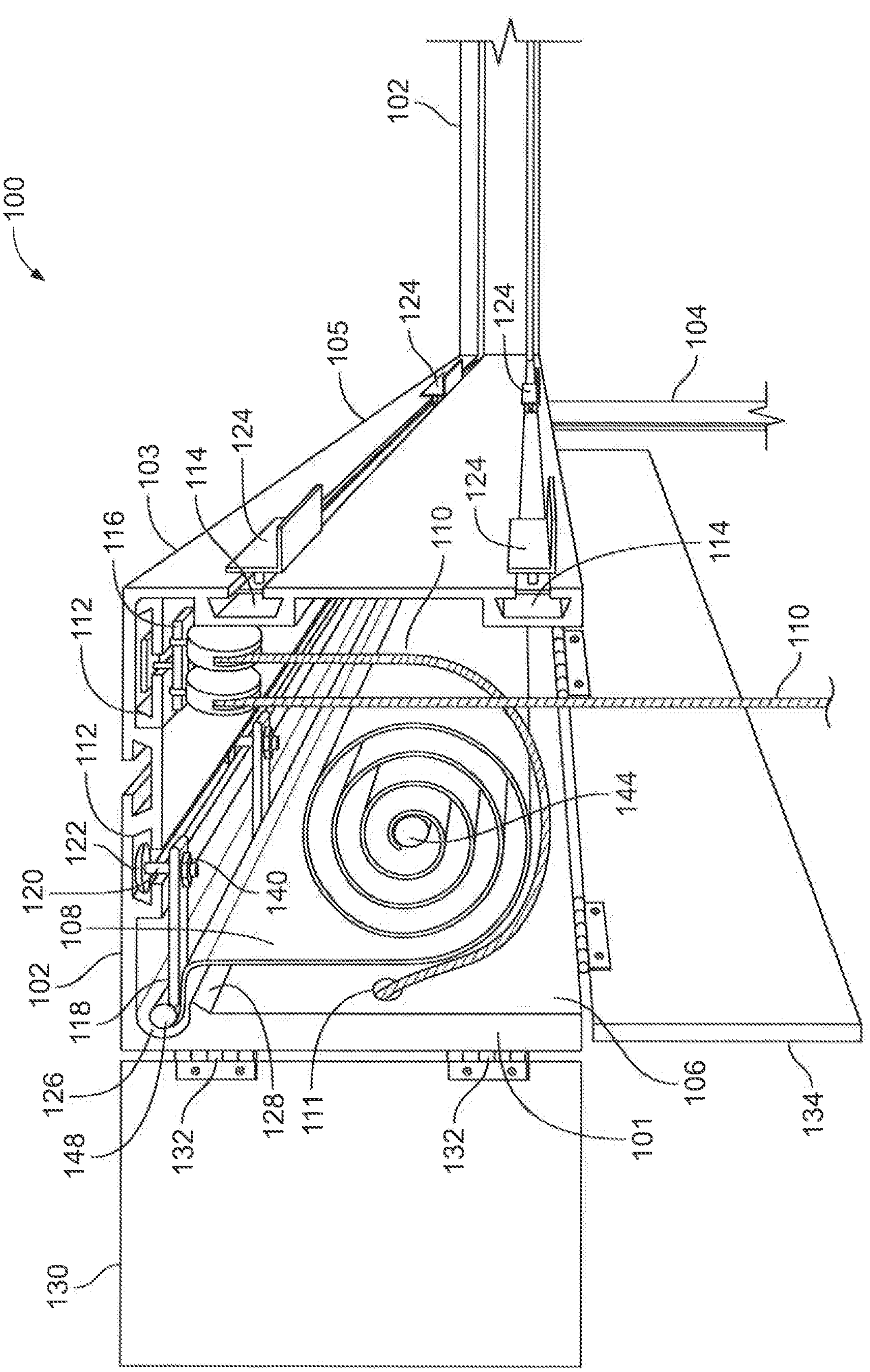
FIG. 1 shows illustrative apparatus in accordance with principles of the invention.

Generally, the leftmost digit (e.g., "L") of a three-digit reference numeral (e.g., "LRR"), and the two leftmost digits (e.g., "LL") of a four-digit reference numeral (e.g., "LLRR"), identify the first figure in which a part is called-out.

DETAILED DESCRIPTION OF THE DISCLOSURE

Apparatus and methods for shelter are provided.

The apparatus may include a channel. The channel may define an interior. The interior may be configured to store a wall.

The channel may include wood, plastic, metal, sheet metal, any other suitable material, or a combination thereof. The channel may be formed via an extrusion process. The channel may be formed via a computerized numerical control ("CNC") process. The channel may be formed of one-piece molded, extruded, or formed into the appropriate shape. The channel may be formed of multiple pieces joined together (through fasteners, glue, welding, friction, or any other appropriate method or combination thereof). The channel may be formed by any other suitable method. The channel may be powder-coated.

The channel may have a square cross-section. The channel may have a rectangular cross-section. The channel may have a circular cross-section. The channel may have an elliptical cross-section. The channel may be "U"-shaped. The channel may be "C"-shaped. The channel may have any other suitable cross-section or shape.

The channel may include a first panel, a second panel, and a third panel. The first panel may be perpendicular to the second panel. The channel may have one, two, three, or more exterior faces.

The channel may have a length. The length may be variable or extendable. The channel may extend in a longitudinal direction. The channel may define a longitudinal direction. The channel may be curved. The channel may be straight. The channel may be circular. The channel may have two ends, i.e., a first end and a second end. The first end of the channel may be mitered. Miter angles may be between 0.1 and 89.9 degrees. The second end of the channel may be mitered. Miter angles may be between 0.1 and 89.9 degrees. Two or more channels may be joined together.

The channel may be supported by a support. The support may be oriented in a vertical orientation. The support may be positioned perpendicular to the length of the channel. The support may be oriented in a horizontal orientation. Multiple supports may be stacked upon each other to form a larger support.

The support may have a rectangular cross-section. The support may have a circular cross-section. The support may have a right-angle cross section. The support may have an angular cross-section. The support may have a "T"-shaped cross-section. The support may be ferromagnetic. The support may include ferromagnetic materials. A portion of the support may be ferromagnetic.

The support may include panels. The panels may be perpendicular to each other. The support may have a length. The support may include a slot extending along the length of the support. The slot may be configured to hold a portion of a wall. The slot may have a "T"-shaped cross section. The slot may have a circular cross-section. The slot may have a rectangular cross-section. The slot may be configured to support the wall. The slot may be configured to slidably support the wall. The slot may be configured to support a zipper tape. The slot may be configured to support a dowel. The dowel may be configured to support a zipper tape. The zipper tape may include one half of a zipper. One half of the zipper may be configured to zip together with another half of a zipper. Another half of the zipper may be located on the wall. The dowel may be configured to support a track. The track may be configured to accept a slider. The slider may be configured to seal an edge as it slides in a direction along the track. The seal may be weather resistant. The seal may be weatherproof.

The channel may define a slot. The channel may include a slot. The slot may be a "T"-slot. The slot may have a circular cross-section. The slot may have a curved cross-section. The slot may have a variable cross-section. The slot may be any other suitable shape. The slot may have any other suitable cross-section.

The slot may extend along a length of the channel in the interior of the channel. The slot may be configured to receive a retainer. The retainer may retain a portion of a storable wall against a surface of the channel. The slot may be configured to support the retainer. The slot may be configured to slidably support the retainer.

The channel may include multiple slots extending along a length of the channel in the interior of the channel. The interior slots may extend along a longitudinal direction defined by the channel, in the interior of the channel.

The interior slots may be configured to support an accessory. The interior slots may be configured to slidably support an accessory. An accessory may include, inter alia, a light, a fan, an air conditioner, a heater, a speaker, a power cord, and any other suitable accessory. The light may be an LED light or lights.

The channel may include a slot extending along a length of the channel on the exterior of the channel. The exterior slot may extend along a longitudinal direction defined by the channel. The exterior slot may extend along an exterior face of the channel in a longitudinal direction defined by the channel. The channel may include multiple exterior slots. The channel may include multiple exterior slots on one exterior face of the channel. The channel may include multiple, additional, exterior slots on multiple exterior faces of the channel.

The exterior slots may be configured to support an accessory. The exterior slots may be configured to slidably support an accessory. An accessory may include a light, a fan, an air conditioner, a heater, a speaker, a power cord, and any other suitable accessory. The light may be an LED light or lights.

The exterior slots may be configured to support a bracket. The bracket may be configured to support a roof. The bracket may be configured to support a roof support. The bracket may be configured to support a roof beam. The bracket may be configured to support a rafter. The rafter may include a pergola beam. The bracket may be configured to support a pergola beam. The rafter may include a slot. The slot may be configured to support an item.

The exterior slots may be configured to support the roof.

The channel may include a surface. The channel may include a panel. The surface may be an interior wall of the channel. The surface may protrude into the interior of the channel. The surface may extend from the panel into the interior. The surface may be defined by a recess of the channel. The surface may be recessed into the panel. The surface may include a retaining lip. The surface may include a bottom retaining lip. The surface may include a top retaining lip. The surface may extend along a length of the channel. The retaining lip may extend along a length of the channel. The surface may extend along a longitudinal length of the channel. The surface may be curved. The surface may include ridges. The surface may be angled. The surface may be both curved and angled. The surface may be painted. The surface may include a rough coating to help grip a storable wall. The surface may be roughened. The surface may be roughened to increase friction.

The surface may be located near an interior corner of a cross-section of the channel.

The surface may be inside a slot extending along a length of the channel in the interior. The surface may extend along the length of the slot.

The apparatus may include a retainer. The retainer may be configured to retain a storable wall against the surface. The retainer may include a dowel. The slot may be configured to receive the dowel. The dowel may extend along the slot. The dowel may be fixed to the furlable wall at a location inside the slot so that the dowel may retain the storable wall against a force urging the wall to be withdrawn from the slot. The force may be a force that causes the dowel to press the wall against a surface of the channel.

The retainer may include an anchor that may be configured to engage the slot. The anchor may be configured to slide along a length of the slot. The anchor may be circular, polygonal, or any other suitable shape. The anchor may be a nut. The anchor may include a washer. The anchor may include a nut. The anchor may be configured to tightly fit inside the slot. The anchor may be configured to be removed from the slot. The anchor may extend along a length of the slot.

The retainer may include an extension that may extend out of the slot when the anchor is engaged in the slot. The extension may be a bolt. The extension may include a threaded area.

The retainer may include a projection that may be supported by the extension. The projection may be configured to be oriented in a position or a direction so that the projection may retain the wall against the surface. The projection may extend from a first retainer to a second retainer that is disposed inside the slot. The projection may be circular, polygonal, or any other suitable shape. The projection may extend along a length of the slot. The projection may extend along a length of the slot that is greater than the projection's width.

The apparatus may include a wall. The wall may be storable. The wall may be furlable. The wall may be rollable. The wall may be foldable. The wall may be flexible. The wall may include natural fibers, synthetic fibers, plastic, wood, metal, any other suitable material, or a combination thereof. The wall may be transparent. The wall may be opaque. The wall may include a window. The may include a doorway. The wall may include an opening. The opening may be configured to be sealed. The opening may be configured to be opened and closed.

The wall may be furled. The wall may be unfurled. The wall may be rolled. The wall may be unrolled. The wall may be folded. The wall may be unfolded.

The wall may include a dowel. The dowel may be located along an end of the wall. The dowel may be configured to help roll the wall. The dowel may be configured to help unroll the wall. The dowel may be configured to help furl the wall. The dowel may be configured to help unfurl the wall. The dowel may be configured to help store the wall. The dowel may be configured to help extend the wall.

The wall may include a dowel. The dowel may be located along an end of the wall. The dowel may be configured to engage the surface. The retainer may press the dowel against the surface.

The wall may include a sleeve. The sleeve may be configured to hold a dowel. The wall may include a top edge and a bottom edge. The wall may include a sleeve on the top edge. The wall may include a sleeve on the bottom edge.

Two or more walls may be joined together. Two or more walls may be joined together with a zipper. Two or more walls may be joined together through Velcro. Two or more walls may be joined together through a line. Two or more walls may be joined together through hooks. Two or more walls may slide together when each contains a male or female slide. Two or more walls may be joined together through Velcro, magnets, or any other suitable fastener or fastening system.

The wall may include a zipper. The zipper may be of any suitable type. The zipper may be located at an edge of the wall. The zipper may be weather resistant. The zipper may include a cover. The zipper may include tape. The tape may be polyester. The tape may be sewn to the wall. The tape may be joined to the wall. The tape may be glued to the wall. The wall may include a grommet. The wall may include a hook. Two or more walls may be joined together through the grommet and hook. The may include a snap. Two or more walls may be joined together through the snaps.

The wall may include a track. The track may include a mating profile. The mating profile may be tongue and groove. The track may include a female side. The track may include a male side. The female side and male side may be configured to join together to create a seal. The wall may include a slider. The slider may be configured to join the female side and male side together. The joinder may support the weight of the wall. The joinder may support the wall against weather. The track and slider may be configured to form a seal when the slider slides along the track. The seal may be weather resistant. The seal may be weatherproof.

The wall may be configured to be attached to the support. The wall may be attached to the support through a zipper. The wall may be attached to the support through a track. The wall may be glued to the support. The wall may be attached to the support through a magnet. The wall may be slid down the support. The wall may be slid down a slot on the support. The wall may be configured to be locked into the slot.

The wall may be tensioned. The wall may be elastic. The wall may include elastic. The wall may be stretchable.

The apparatus may include a spool. The apparatus may include an end plate. The apparatus may include a spool bracket. The end plate may be disposed transversely adjacent to an end of the channel. The end plate may support the spool bracket. The spool bracket may support the spool. The spool bracket may include a gudgeon. The gudgeon may include a bearing. The spool may be configured to retain the wall. The wall may be furlable with the spool. The wall may be rolled and unrolled with the spool. The wall may be furlable without a spool. The wall may be retractable with the spool. The wall may be retractable without a spool.

The apparatus may include a roller tube. The roller tube may have a first end. The roller tuber may have a second end. The roller tube may be hollow. The roller tube may be solid. The wall may be wrapped around the roller tube. The wall may be rolled around the roller tube. Each end of the roller tube may include a spool. An end of the roller tube may include a spool. An end of the roller tube may include two or more spools. A spool may be configured to rotate the roller tube so that the wall may extend in a downward direction. A spool may be configured to rotate the roller tube so that the wall may retract in an upward direction. A spool may be configured to rotate the roller tube so that the wall may extend and retract. A spool may include a line configured to rotate the spool. The line may be a chain. The line may be a rope. A spool may include an axle. The axle may be configured to be inserted into a gudgeon. The axle may rotate the spool. The axle may rotate with a bearing. The apparatus may include a gudgeon. The gudgeon may include a bearing. The gudgeon may be attached to an end plate. The gudgeon may be configured to be stationary. The spool may be in line with the gudgeon.

The spool may be motorized. The spool may be mechanically rotated.

The channel may include a guide that may be configured to be slid in and anchored in a slot extending along a length of the channel in the interior. The slot may be a second slot extending along a length of the channel in the interior. The channel may include a first guide and a second guide that may be configured to be slid in and anchored in a second slot.

The first guide may include a sheave. The second guide may include a sheave. A sheave may be a pulley. A sheave may include multiple pulleys. A guide may be a pulley. The pulley may be fixed, movable, or compound. The pulley may be electrified. The pulley may be connected to an electric motor.

The apparatus may include a line. The line may include a rope. The line may be braided. The line may be non-woven. The line may include a filament. The line may include a chain. The line may have one end fixed to the channel. The line may be fixed to the channel through glue. The line may be fixed to the channel by running the line through a hole in the channel and knotted or secured on an exterior face of the channel. The line may be knotted on one side of the hole. The side of the hole may be an exterior side of the channel. The knot may be a stop knot. The line may be fixed to the channel by running it through one or more holes in the channel and knotting or securing it on either an exterior face of the channel or in the interior of the channel. The line may be fixed to an interior face of the channel. The line may be fixed to an interior face of the channel through glue. The line may be fixed to an interior face of the channel through a fastener. The line may be fixed to an interior slot. The line may be fixed to an interior slot through a bracket supported by the interior slot. The line may be tied to the bracket. The line may be glued to the bracket.

The line may run around the wall and through a first guide and a second guide. The line may be configured to lower the wall. The line may be configured to raise the wall. The line may be configured to furl the wall. The line may be configured to unfurl the wall. The line may be configured to roll the wall. The line may be configured to unroll the wall. The line may be configured to fold the wall. The line may be configured to unfold the wall. The line may be configured to store the wall. The line may be configured to extend the wall.

The apparatus may include a second line. The second line may include a rope. The second line may be braided. The second line may be non-woven. The second line may include a filament. The second line may include a chain. The second line may have one end fixed to the channel. The second line may be fixed to the channel through glue. The second line may be fixed to the channel by running the second line through a hole in the channel and knotted or secured on an exterior face of the channel. The knot may be a stop knot. The second line may be fixed to the channel by running it through one or more holes in the channel and knotting or securing it on either an exterior face of the channel or in the interior of the channel.

The second line may run around the wall and through a first guide and a third guide. The second line may be configured to lower the wall. The second line may be configured to raise the wall. The second line may be configured to furl the wall. The second line may be configured to unfurl the wall. The second line may be configured to roll the wall. The second line may be configured to unroll the wall. The second line may be configured to fold the wall. The second line may be configured to unfold the wall. The second line may be configured to store the wall. The second line may be configured to extend the wall. The second line may be fixed to an interior face of the channel. The second line may be fixed to an interior face of the channel through glue. The second line may be fixed to an interior face of the channel through a fastener. The second line may be fixed to an interior slot. The second line may be fixed to an interior slot through a bracket supported by the interior slot. The second line may be tied to the bracket. The second line may be glued to the bracket.

The apparatus may include a third line. The third line may include a rope. The third line may be braided. The third line may be non-woven. The third line may include a filament. The third line may include a chain. The third line may have one end fixed to the channel. The third line may be fixed to the channel through glue. The third line may be fixed to the channel by running the third line through a hole in the channel and knotted or secured on an exterior face of the channel. The knot may be a stop knot. The third line may be fixed to the channel by running it through one or more holes in the channel and knotting or securing it on either an exterior face of the channel or in the interior of the channel.

The third line may run around the wall and through a first guide and a fourth guide. The third line may be configured to lower the wall. The third line may be configured to raise the wall. The third line may be configured to furl the wall. The third line may be configured to unfurl the wall. The third line may be configured to roll the wall. The third line may be configured to unroll the wall. The third line may be configured to fold the wall. The third line may be configured to unfold the wall. The third line may be configured to store the wall. The third line may be configured to extend the wall. The third line may be fixed to an interior face of the channel. The third line may be fixed to an interior face of the channel through glue. The third line may be fixed to an interior face of the channel through a fastener. The third line may be fixed to an interior slot. The third line may be fixed to an interior slot through a bracket supported by the interior slot. The third line may be tied to the bracket. The third line may be glued to the bracket.

Further lines may be added, as necessary. Longer or heavier walls may require further lines.

The first guide may include a first sheave, through which the first line may run. The first guide may include a second sheave, through which the second line may run. The first guide may include a third sheave, through which the second line may run.

The apparatus may include a cover configured to enclose the channel. The cover may be configured to enclose one end of the channel. The cover may be configured to enclose the bottom of the channel, that is, enclose the interior (or interior cavity) of the channel. The cover may be hinged. The hinge may include a piano hinge. The hinge may include a continuous hinge. The hinge may include a fabric hinge. The cover may be configured to 'snap-on'. The cover may be configured to be removable. The cover may be weatherproof or weather resistant. The cover may be sealable. The cover may include a weatherproof seal. The weatherproof seal may be rubber.

The apparatus may include a ceiling. The apparatus may include a roof. The ceiling may be an interior face of the roof A slot on the exterior of the channel may be configured to support the ceiling. A slot on the exterior of the channel may be configured to support the roof. A slot on the exterior may be configured to support a bracket which is configured to support the ceiling. A slot on the exterior may be configured to support a bracket which is configured to support the roof.

The ceiling may be flat. The ceiling may be angled. The ceiling may include a drainage system. The drainage system may include a hole. The hole may include a seal. The hole may include a cover. The hole may be sealed. The seal may be removable. The drainage system may include a gutter.

The ceiling or roof may include natural fibers, synthetic fibers, plastic, wood, metal, any other suitable material, or a combination thereof. The ceiling or roof may be furled. The ceiling or roof may be unfurled. The ceiling or roof may be rolled. The ceiling or roof may be unrolled. The ceiling or roof may be folded. The ceiling or roof may be unfolded. The ceiling or roof may be weather resistant. The ceiling or roof may be weatherproof. The ceiling or roof may include a zipper. The ceiling or roof may include two or more panels. Two or more panels of the roof or ceiling may be joined together, through a zipper, Velcro, or any other appropriate methods, to form a larger roof or ceiling.

The ceiling may be weatherproof. The ceiling may be weather-resistant. The ceiling may be permeable to weather. The ceiling may be sealed against the channel. The ceiling may be tensioned. The ceiling may be stretched. The ceiling may be tensioned to form a tighter seal. The ceiling may be elastic. The ceiling may be rigid. The ceiling may be flexible.

The apparatus may include a channel. The channel may define an interior. The channel may define a first slot that may extend along a length of the channel in the interior. The first slot may be configured to receive a retainer. The retainer may retain a retractable wall against a surface of the channel. The surface of the channel may be in the interior. The retractable wall may be configured to retract into the channel. The channel may define a second slot. The second slot may extend along a length of the channel in the interior. The second slot may be configured to support a guide. The guide may include a pulley. The guide may include a sheave. The sheave may include a pulley. The apparatus may include a support. The support may be configured to support the channel. The apparatus may include two or more supports. The channel may be supported by two or more supports.

The first slot may slidably support the retainer. The second slot may slidably support the guide.

The channel may also define an exterior. The apparatus may include a third slot. The third slot may extend along a length of the channel on the exterior. The third slot may be configured to support a roof. The third slot may be configured to support a bracket.

The roof may be storable. The roof may be furlable. The roof may be unfurlable. The roof may be retractable. The roof may be extendable. The roof may be rollable. The roof may be unrollable. The roof may be foldable. The roof may be unfoldable. The roof may be flat. The roof may have a thickness. The roof may be flexible. The roof may be rigid. The roof may be configured to be supported by a support. An edge of the roof may be configured to fit into the third slot. The roof may be furlable into the channel. The roof may be furlable into the interior of the channel. The roof may be stored in the interior of the channel.

A shelter may include one, two, three, four, or more channels. Each channel may be supported by one or more supports. Each channel may include a wall. A support may support two or more channels. The shelter may be formed by arranging the channel(s) and supports and unfurling each wall and extending a roof. The shelter may be formed by arranging the channel(s) and supports and extending each wall and extending a roof. The shelter may be formed by arranging the channel(s) and supports and unrolling each wall and extending a roof. The shelter may be formed by arranging the channel(s) and supports and unfolding each wall and extending a roof.

Extending each wall and joining each wall with an adjacent wall or each support and extending a roof over the shelter may create a self-contained, weather resistant, and germ-resistant shelter. The better the seal between each wall and between the roof and the channels, the better the isolation shelter may be.

The methods may include positioning a section of a wall against an interior surface of a channel. The channel may define an interior. The channel may define an exterior. The channel may have a length. The length may be in the interior. The length may be an interior length. The channel may have an exterior length. The method may include installing a retainer into a slot extending along an interior length of the channel. The method may include retaining the section of the wall, against the surface, with the retainer.

The methods may include positioning the wall inside the channel.

The methods may include adjusting the retainer. The method may include sliding the retainer along the slot.

The methods may include installing a guide into a slot extending along an interior length of the channel.

The methods may include installing a light into a slot extending along a length of the channel. The slot may be on the interior or exterior of the channel.

The methods may include supporting the channel with a support. The method may include vertically supporting the channel with the support. The support may be positioned perpendicularly to the channel. The support may have a first end and a second end. The first end may be positioned against the ground. The second end may be positioned to support the channel.

The methods may include installing a bracket into a slot extending along a length of the channel. The method may include positioning a roof support in the bracket. The method may include supporting a roof on the roof support, or with the roof support. The method may include positioning a rafter in the bracket. The rafter may include a shelf extending perpendicularly away from a bottom of the rafter. The shelf may support an item. The item may be a portion of a roof. The item may be an accessory.

The methods may include installing a roof. The roof may extend from one channel to another channel. An edge of the roof may be installed in a slot extending along an exterior length of the channel. The roof may extend across a width of the channel. The roof may be supported by a roof support.

The roof may consist of two or more beams. The beams may form a pergola roof. The beams may be solid. The beams may be hollow. The beams may be wood, metal, plastic, fabric, any other suitable material, or a combination thereof. The beams may be formed by joining two smaller beams together, one of top of the other. Pergola beams may be joined together through glue. Pergola beams may be joined together through a tongue and groove, with a tongue on one beam and a groove on another beam. Pergola beams may be joined together through fasteners. Fasteners may be nails, screws, bolts, or other suitable fasteners. Any suitable method or combination of methods of joining may be used. The beams may have the same or similar dimensions as a standard 2×6 lumber piece, where 2×6 may be in inches or nominal inches. The beams may be formed by stacking two pieces with standard 2×3 (where 2×3 may be in inches or nominal inches) lumber dimensions on top of each other, forming a 2×6.

Pergola beams may include a bottom. Pergola beams may include a slot. The slot may be configured to support an item. Pergola beams may include a shelf. The shelf may extend from the bottom away from the beam. The shelf may extend in both directions away from the beam. The beams may include two or more shelves, each extending away from the bottom of the beam. The shelf may be parallel to the ground. The shelf may include a slot. The shelf may be configured to support an item. The slot may be configured to support an item. An item may include a roof. An item may include a support. An item may include a light. An item may include a fan. An item may include a wire. An item may include a sound system.

Illustrative embodiments of apparatus and methods in accordance with the principles of the invention will now be described with reference to the accompanying drawings, which form a part hereof. It is to be understood that other embodiments maybe utilized, and that structural, functional, and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

FIG. 1 shows illustrative apparatus 100 for forming a shelter. Apparatus 100 may include channels 102 and supports 104. Supports 104 may be arranged to support channels 102 to form part or all of a shelter or shelter frame.

Channels 102 may form an interior 106. Channels 102 may be wood, plastic, metal, any other suitable material, or a combination thereof. Channels 102 may have a square cross-section, a rectangular cross section, a circular cross section, an elliptical cross-section, may be "U"-shaped, may be "C"-shaped, or may be any other suitable shape or have any other suitable cross-section, or a combination thereof. Channels 102 may be formed via an extrusion process. Channels 102 may be formed via a CNC braking or CNC milling process. Channels 102 may be formed of one piece molded or formed into the appropriate shape. Channels 102 may be formed of multiple pieces joined together (through fasteners, glue, welding, friction, or any other suitable method or combination thereof). Channels 102 may be formed from panels 101, 103, and 105.

Channels 102 may include one or more walls 108 disposed inside interior 106. Walls 108 may be supported and raised or lowered by one or more lines 110. Lines 110 may be threaded through holes 111 and knotted (not shown) on an exterior side of panel 101. Holes 111 may be positioned at a lower point than surface 126.

Walls 108 may include of one of the following: natural fibers, synthetic fibers, plastic, wood, metal, any other suitable material, or a combination thereof.

Walls 108 may be furled. Walls 108 may be unfurled. Walls 108 may be rolled. Walls 108 may be unrolled. Walls 108 may be folded. Walls 108 may be unfolded. Walls 108 may be retracted. Walls 108 may be stored. Walls 108 may be extended.

Walls 108 may include a dowel 144 to facilitate raising and lowering. Dowel 144 may facilitate rolling and unrolling. Dowel 144 may facilitate furling and unfurling. Dowel 144 may facilitate folding and unfolding. Dowel 144 may be solid. Dowel 144 may be hollow. Dowel 144 may consist of one of the following: natural fibers, synthetic fibers, plastic, wood, metal, any other suitable material, or a combination thereof.

Walls 108 may include a dowel 148. Dowel 148 may hold walls 108 against surface 126. Dowel 148 may be configured to fit into surface 126. Dowel 148 may be solid. Dowel 148 may be hollow. Dowel 148 may include of one of the following: natural fibers, synthetic fibers, plastic, wood, metal, any other suitable material, or a combination thereof.

Channels 102 may include one or more interior slots 112 and one or more exterior slots 114. Interior slots 112 may extend along a length of the channel 102. Exterior slots 114 may extend along a length of the channel 102. Slots 112 may extend along the entire length of the channel 102. Slots 114 may extend along the entire length of the channel 102. Slots 112 may be T-slots. Slots 114 may be T-slots. Slots 112 may have a circular cross-section, rectangular cross-section, or a square cross-section. Slots 112 may have any other suitable cross-section, or a combination of different cross-sections. Slots 114 may have a circular cross section, rectangular cross-section, or a square cross-section. Slots 114 may have any other suitable cross-section, or a combination of different cross-sections. Slots 112 may be configured to support an item. Slots 114 may be configured to support an item. The item may be, inter alia, guides 116, retainer 118, retainer extension 120, retainer nut 140, retainer anchor 122, brackets 124, other brackets (not shown), lights (not shown), sound systems (not shown), fans (not shown), air conditioners (not shown), heaters (not shown), and a roof (not shown). Slots 114 may be configured to support a roof (not shown).

Retainer anchor 122 and guides 116 may slide along the length of slot 112. Other items may also slide along the lengths of slots 112 and slots 114. The retainer anchor 122 may be connected to retainer extension 120. Retainer extension 120 may extend through a hole (not shown) in retainer 118 and be secured by a nut 140.

Guides 116 may be pulley sheaves. Guides 116 may be pulleys. Guides 116 may guide lines 110 to raise and lower walls 108. Lines 110 may be ropes.

Channels 102 may include a surface 126. Surface 126 may extend along a length of channel 102 or extend along the entire length of channel 102. Surface 126 may include a protruding edge 128. Surface 126 may be curved. Surface 126 may be straight. Surface 126 may be located near a corner of channels 102. Surface 126 may be recessed in a wall of channels 102.

Retainer 118 may retain a portion of wall 108 against surface 126. Retainer 118 may be adjustable to more or less securely retain a portion of wall 108 against surface 126. Retainer 118 may retain dowel 148 against surface 126. Multiple retainers 118 may be used to retain a portion of wall 108 at different positions along the length of surface 126. Multiple retainers 118 may be used to retain one or more dowels 148 at different positions along the length of surface 126.

Channels 102 may include an end cover 130 arranged to enclose an end of channels 102. Cover 130 may be hinged and attached to channels 102 through hinges 132. Hinges 132 may include fabric hinges. Hinges 132 may include piano hinges. Cover 130 may be removable. Cover 130 may be arranged to 'snap-on' to channels 102. Cover 130 may be formed from the same or different materials as channels 102. Cover 130 may be locked. Cover 130 may be bolted shut. Cover 130 may include a spring. Hinges 132 may be spring-loaded.

Channels 102 may include a bottom cover 134 arranged to enclose the bottom of channels 102. Cover 134 may be hinged and attached to channels 102 through hinges 136. Cover 134 may be removable. Cover 134 may be arranged to 'snap-on' to channels 102. Cover 134 may be formed from the same or different materials as channels 102. Cover 134 may be locked. Cover 134 may be bolted shut. Cover 134 may include a spring. Hinges 136 may be spring-loaded.

Brackets 124 may support a roof Brackets 124 may support a roof support (not shown).

Figure 2:
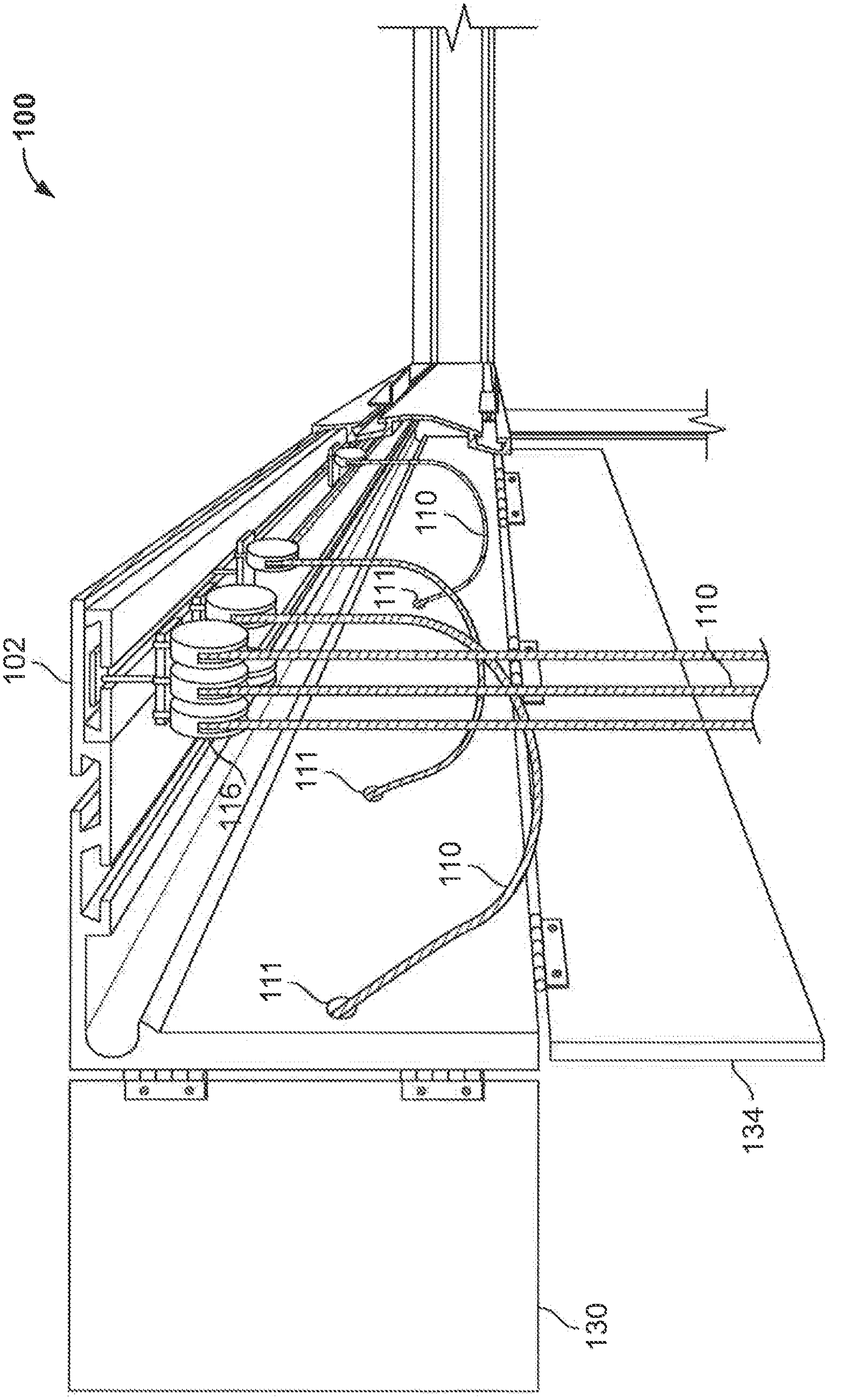
FIG. 2 shows illustrative apparatus in accordance with principles of the invention.

FIG. 2 shows channels 102 with panel 105 partially removed for viewing purposes and wall 108 removed to display the interior 106. Multiple guides 116 and lines 110 are shown. Different configurations of guides 116 and lines 110 may be used, including additional or fewer lines 110 and guides 116. Guides 116 may be pulleys. Guides 116 may be pulley sheaves.

Figure 3:
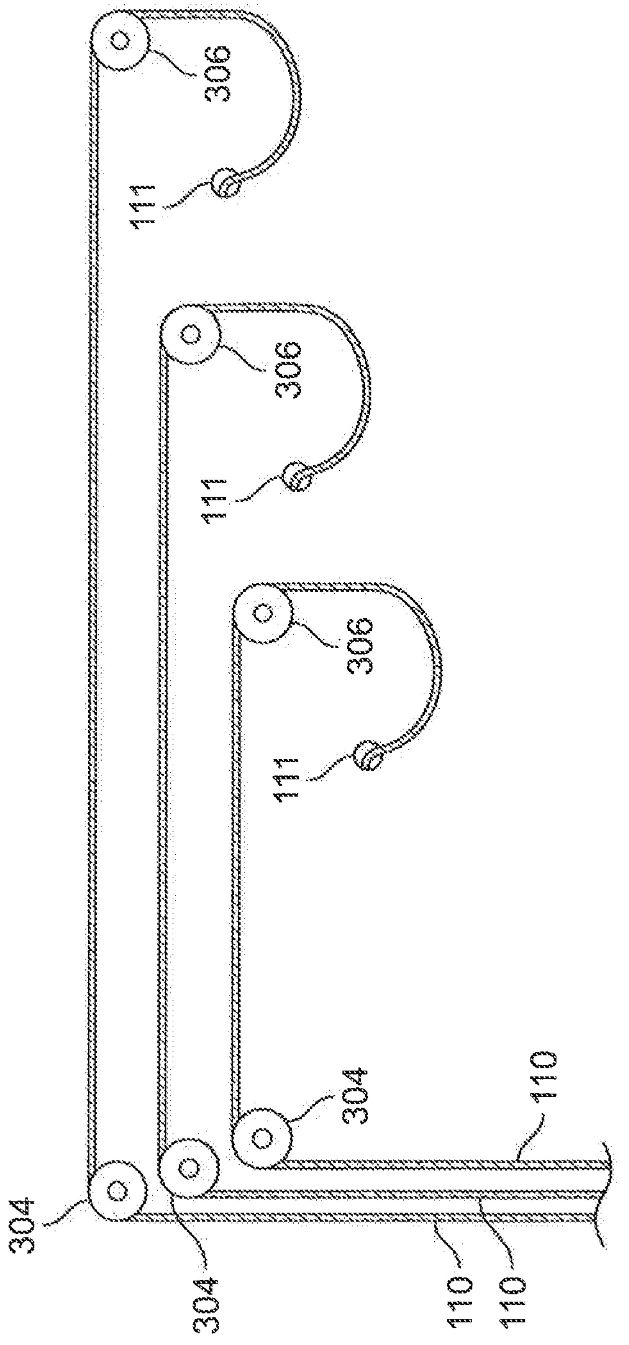
FIG. 3 shows an illustrative schematic in accordance with principles of the invention.

FIG. 3 shows a schematic of guides 304, guides 306, and lines 110. Each line 110 may be threaded through holes 111. Holes 111 may be located in panel 101 of channels 102. Each line 110 may form a knot (not shown) on an exterior side of panel 101. Knots (not shown) may be large enough that lines 110 cannot be forced back through holes 111.

Each line 110 may be threaded around a first guide 304 and then extended around a second guide 306. Guides 304 and 306 may be pulleys. Guides 304 and 306 may be pulley sheaves. Guides 304 and 306 may be any other suitable guide mechanism. Guides 116 (in FIGS. 1, 2 and others) may include guides 304 and 306. Guides 304 and 306 may include one or more features in common with guides 116.

Lines 110 and guides 304 and 306 may be configured so that pulling on each line 110 may raise or lower a wall (not shown).

Additional lines 111 may be added or removed as necessary.

Figure 4:
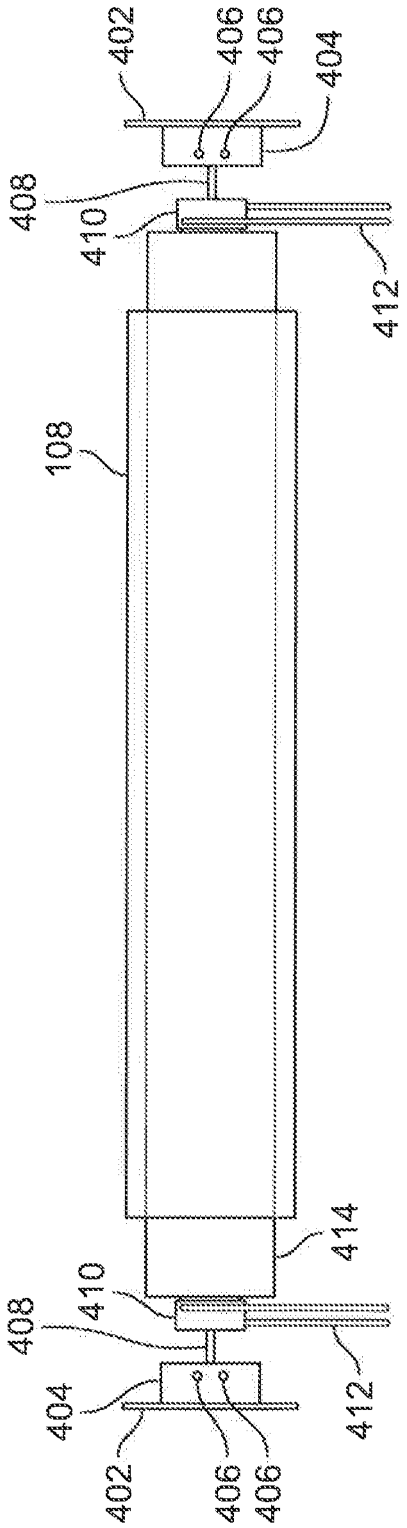
FIG. 4 shows illustrative apparatus in accordance with principles of the invention.

FIG. 4 shows a wall 108 wrapped around a roller tube 414. Each end of roller tube 414 may include a spool 410. Each spool 410 may include a line 412. Each spool 410 may be connected to a gudgeon 404 through an axle 408. Each axle 408 may rotate with the help of a bearing or bearings 406. Each gudgeon may be attached to an end plate 402.

Each gudgeon 404 may be configured to remain stationary while spool 410 and axle 408 rotate roller tube 414. The spools 410 may be motorized.

Figure 5:
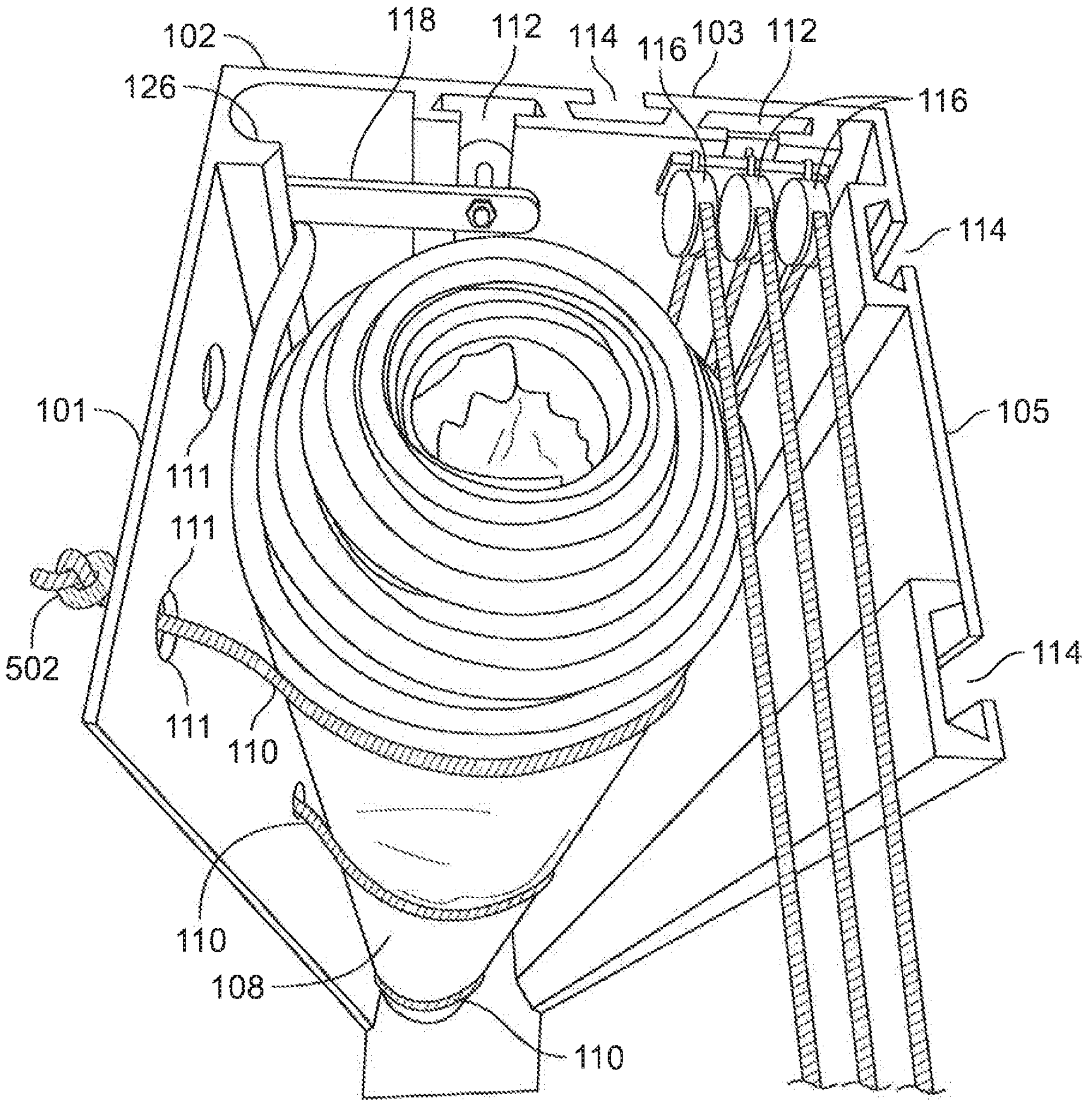
FIG. 5 shows illustrative apparatus in accordance with principles of the invention.

FIG. 5 shows channel 102 from a different perspective than that shown in FIG. 1 with wall 108 rolled and stored inside interior 106. Knot 502 of line 110 may appear on the exterior of panel 101. FIG. 4 shows three lines 110 along with three first guides 304.

Figure 6:
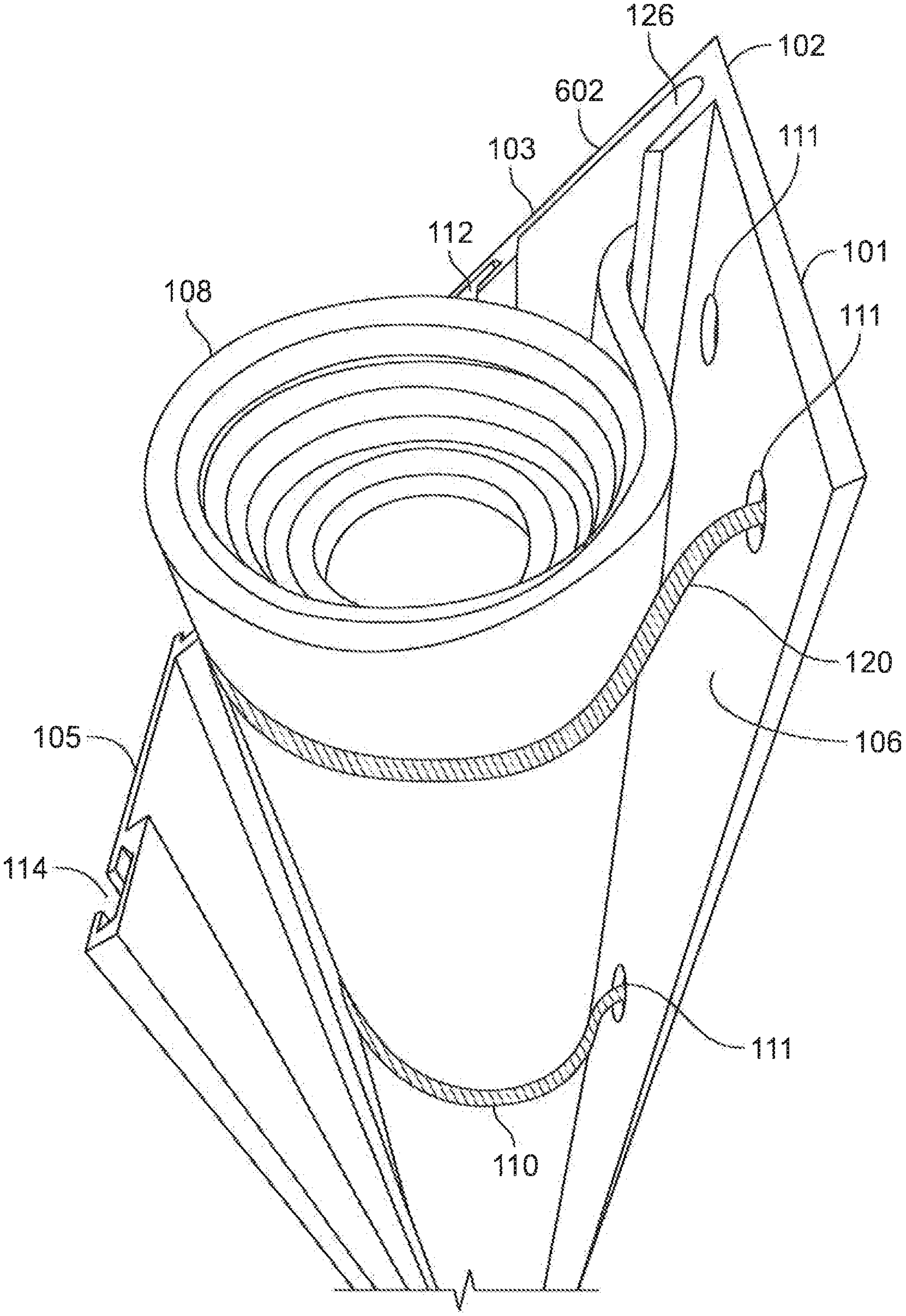
FIG. 6 shows illustrative apparatus in accordance with principles of the invention.

FIG. 6 shows channel 102 from a different perspective than that shown in FIGS. 1, 2, and 4, with wall 108 rolled and stored inside interior 106. Channel 102 may have a mitered end 602. Mitered end 602 may allow channel 102 to be arranged next to other channels 102 at various angles to form various walls of a shelter.

Figure 7:
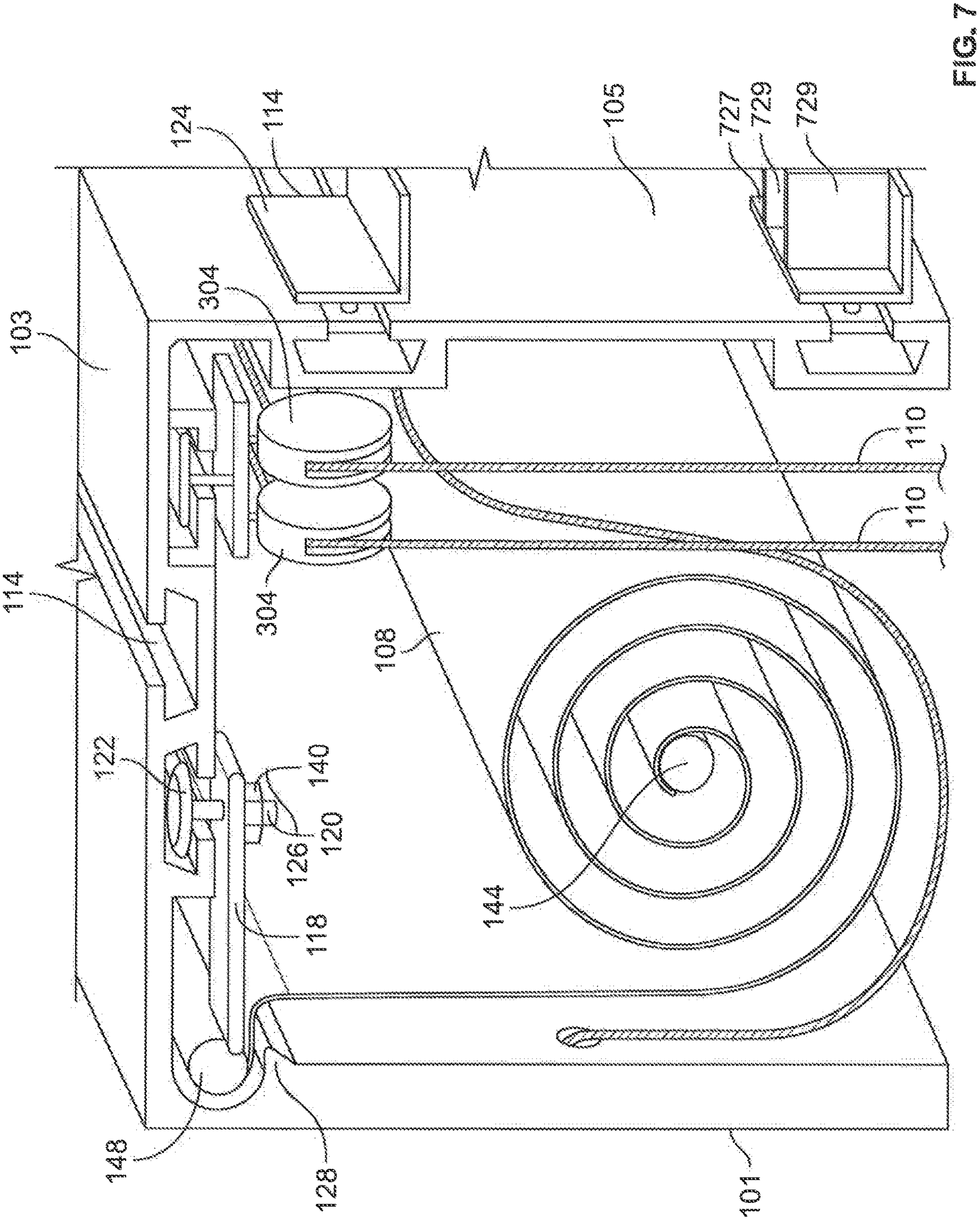
FIG. 7 shows illustrative apparatus in accordance with principles of the invention.

FIG. 7 shows channel 102 from a different and closer perspective than that shown in FIG. 1. Exterior slots 114, including exterior slot 114 on panel 103 are visible. Panel 103 may be the top panel. FIG. 7 shows two lines 110 along with two first guides 304. Bracket 727 may include two vertical walls 729. Bracket 727 may include one or more features in common with bracket 124. Vertical walls 729 may be configured to reliably secure a support. Vertical walls 729 may be configured to reliably secure a roof support. Vertical walls 729 may be configured to reliably secure a rafter. Vertical walls 729 may be configured to reliably secure an item.

Figure 8:
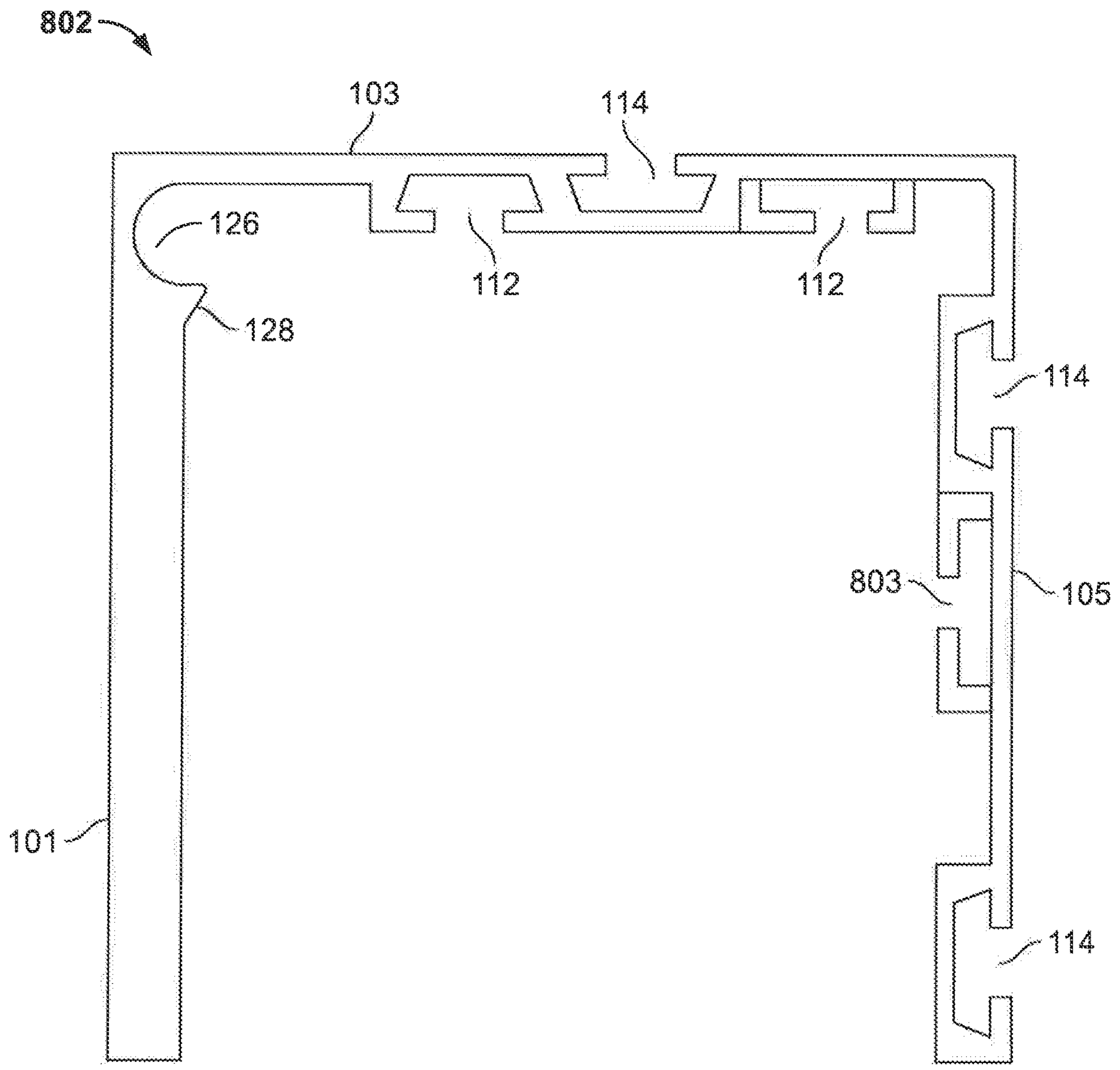
FIG. 8 shows illustrative apparatus in accordance with principles of the invention.

FIG. 8 shows a side-view of channel 802 from a different perspective than that shown in FIG. 1 without a wall 108, a retainer 118, and a guide 116. Channel 802 may include one or more features in common with channel 102. Exterior slots 114 may be located on panels 103 and 105. Surface 126 may be located on panel 101 or on panel 103. Additional interior slot 803 is shown. Interior slot 803 may support an item. Interior slots 112 and 803 may be located on panels 103 and 105 respectively. Slot 803 may include one or more features in common with slots 112 and 114.

Figure 9:
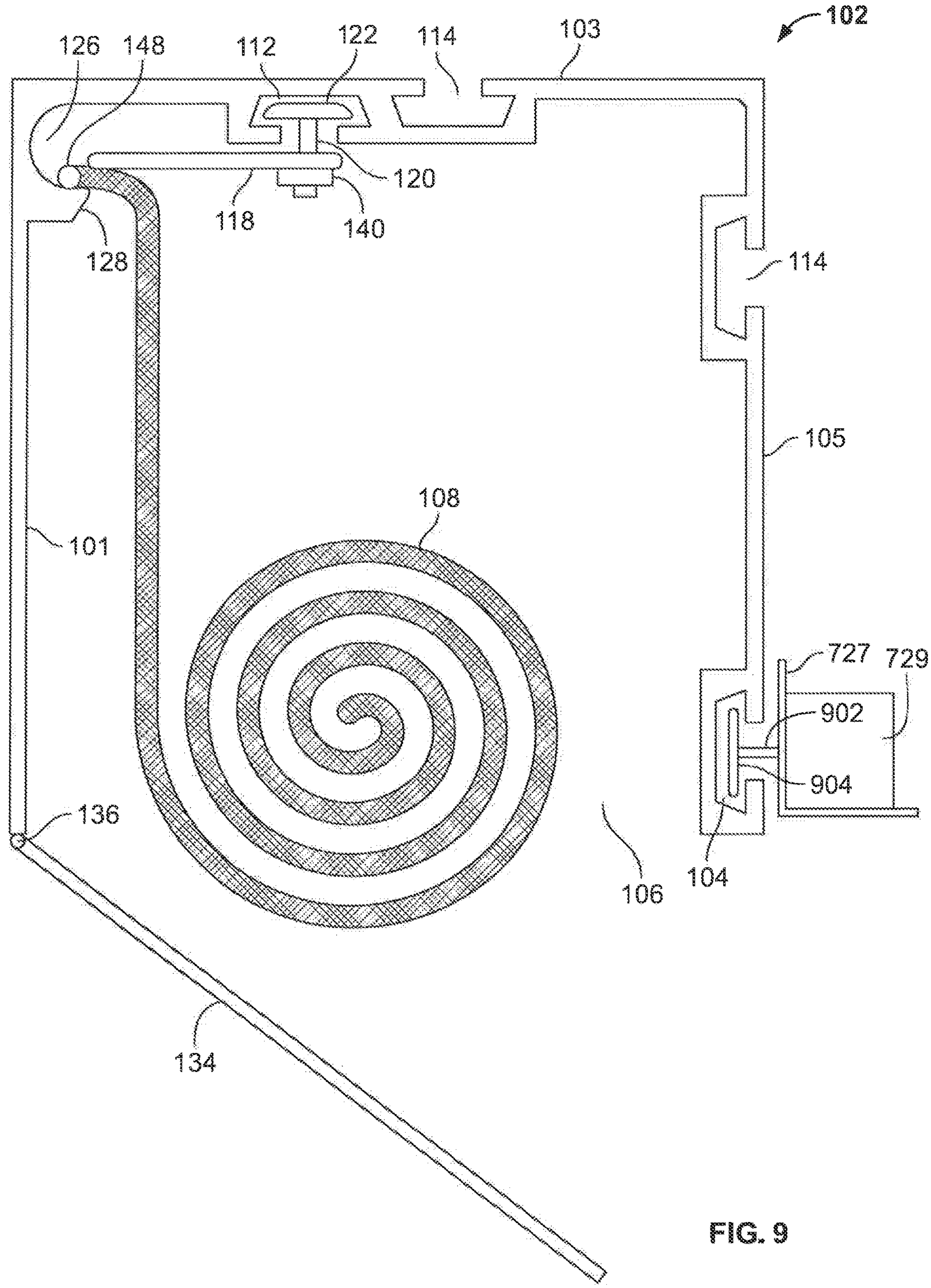
FIG. 9 shows illustrative apparatus in accordance with principles of the invention.

FIG. 9 shows a side-view of channel 102 from a different perspective than that shown in FIG. 1 and without guides 116 and only one interior slot 112. Bracket 727 is supported in exterior slot 114 by bracket anchor 904 and bracket extension 902. Bracket anchor 904 may be slidable along exterior slot 114. Wall 108 may be held inside interior 106 by bottom cover 134. Wall 108 may be lowered or released when bottom cover 134 is opened. Wall 108 may be manually stored, without mechanical help from guides 116.

Figure 10:
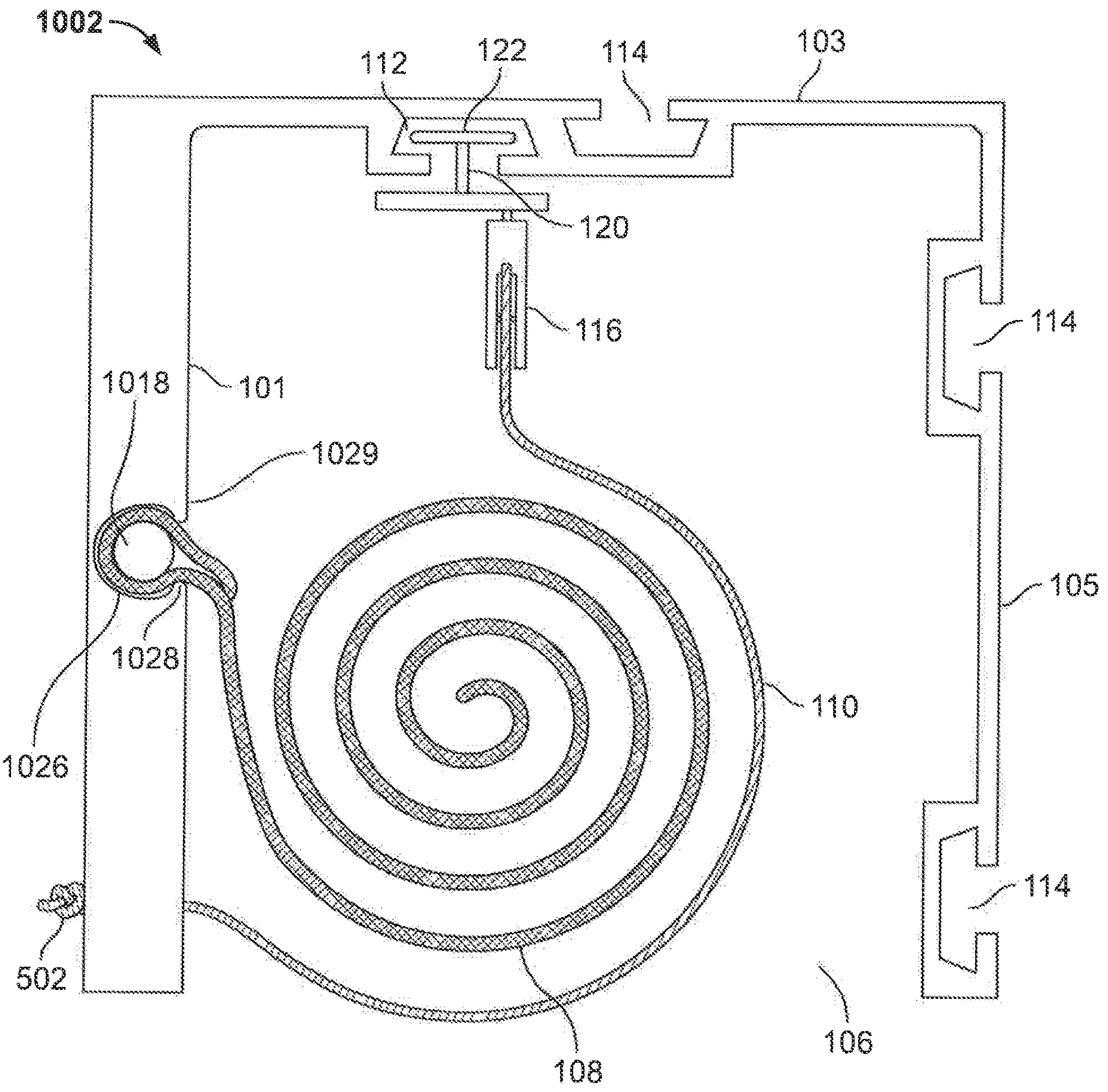
FIG. 10 shows illustrative apparatus in accordance with principles of the invention.

FIG. 10 shows a side-view of channel 1002. Channel 1002 may include one or more features in common with channels 102 and 802. Channel 1002 may include panels 101, 105, and 103. Channel 1002 may include exterior slots 114 and an interior slot 112. Guide 116 may be supported by guide anchor 122 and guide extension 120 in interior slot 112. Line 110 may extend around wall 108 (and support wall 108) through a hole (not shown) in panel 101 and tied in a knot 502 on an exterior side of panel 101. Knot 502 may be configured so that line 110 may not fall through the hole.

Retainer 1018 may retain a portion of wall 108 against surface 1026. Retainer 1018 may include one or more features in common with retainer 118. Retainer 1018 may be adjustable to more or less securely retain a portion of wall 108 against surface 1026. Surface 1026 may include one or more features in common with surface 126. Multiple retainers 1018 may be used to retain a portion of wall 108 at different positions along the length of surface 1026. A single retainer 1018 may be used to retain a portion of wall 108 along a portion of the length of surface 1026.

Retainer 1018 may be a dowel. Retainer 1018 may have a diameter larger than the opening between bottom retaining lip 1028 and top retaining lip 1029. Retainer 1018 may be installed by threading it through from one end of channel 1002. Wall 108 may be arranged around retainer 1018 before or after retainer 1018 is installed in surface 1026.

Figure 11:
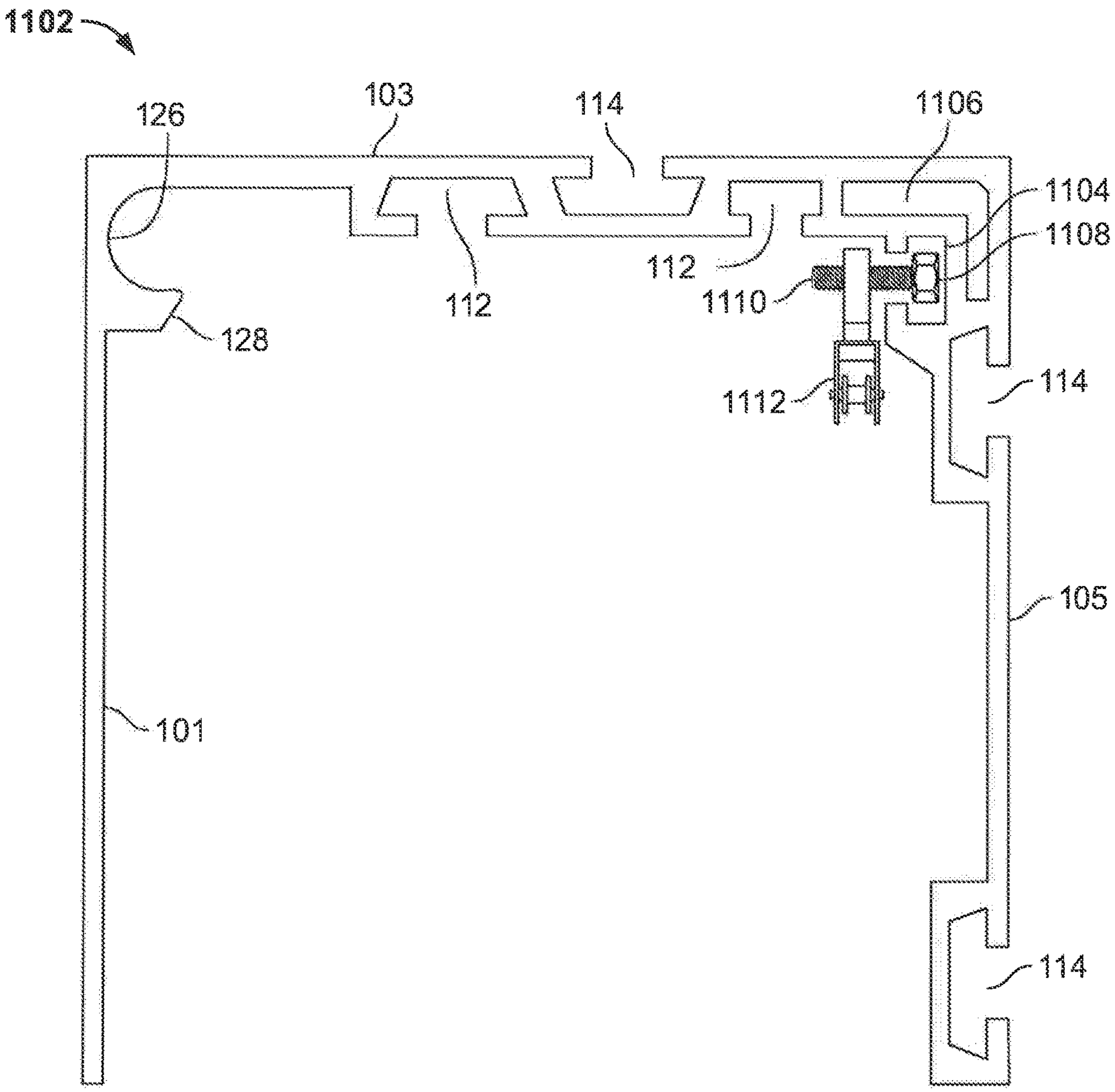
FIG. 11 shows illustrative apparatus in accordance with principles of the invention.

FIG. 11 shows an illustrative apparatus. The apparatus may include one or more features in common with the apparatus or features shown in FIGS. 1-10. Channel 1102 may include interior slots 112 and exterior slots 114. Channel 1102 may include an interior slot 1104. Interior slot Interior slot 1104 may be located on an interior face of panel 105. Interior slot 1104 may be configured to support a guide 1112. Guide 1112 may be a pulley. Guide 1112 may be a pulley sheave. Guide 1112 may be supported by bolt 1110. Bolt 1110 may be supported by anchor 1108 in slot 1104. Anchor 1108 may be a nut. Anchor 1108 may be configured to slide in slot 1104.

Channel 1102 may include a hole 1106. Hole 1106 may allow for channel 1102 to be manufactured more easily. Hole 1106 may extend the length of channel 1102. Hole 1106 may lighten the weight of channel 1102. Other channels described in this disclosure may include a hole.

Figure 12:
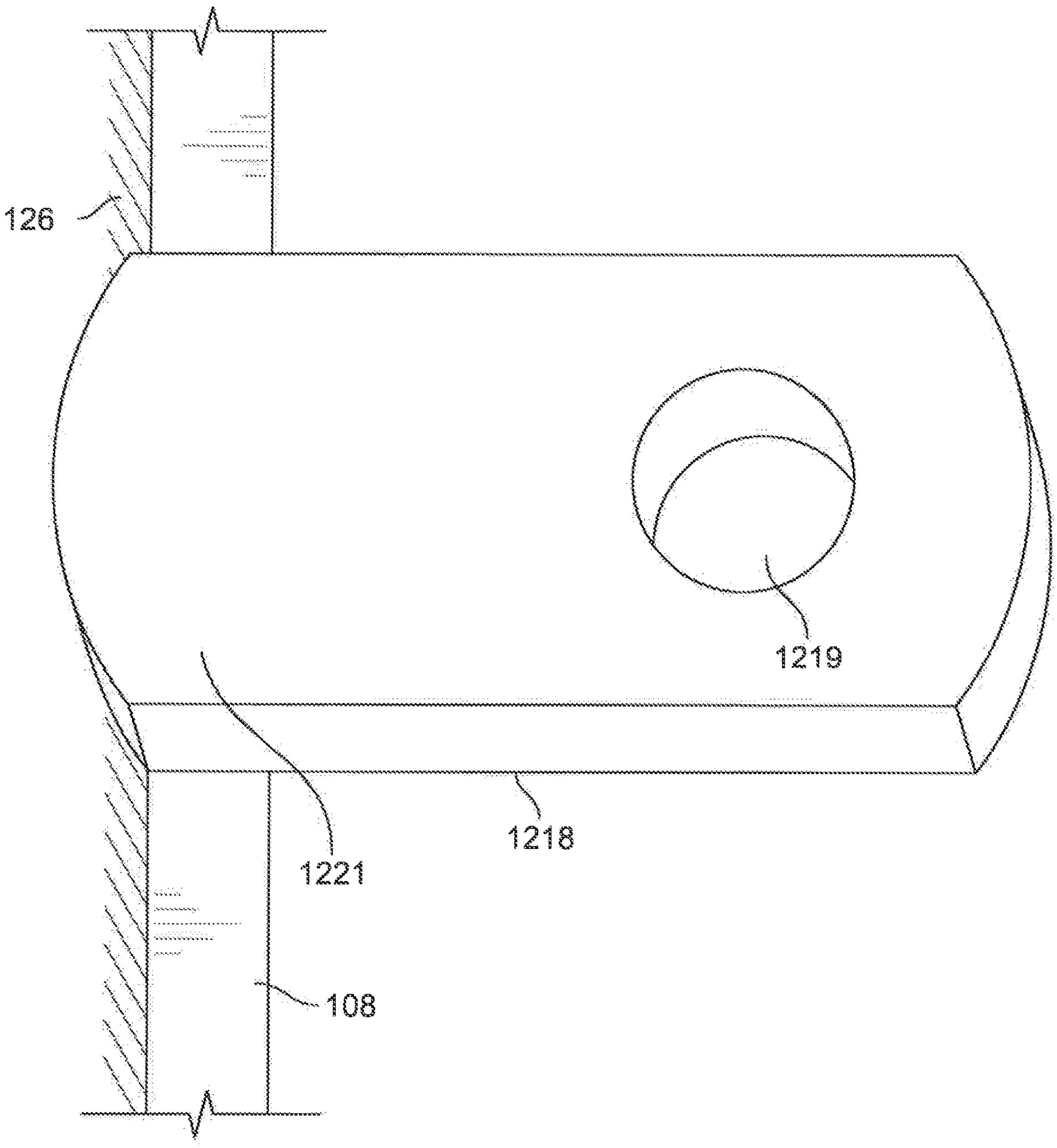
FIG. 12 shows illustrative apparatus in accordance with principles of the invention.

FIG. 12 shows a top perspective of retainer 1218. Retainer 1218 may include one or more features in common with retainer 118. Retainer 1218 may include a projection/spline 1221 and a hole 1219. Extension 120 (not shown) may extend through hole 1219 from anchor 122 (not shown) and be held onto retainer 118 through a nut 140 (not shown). A washer (not shown) may also be used to hold extension 120. Spline 1221 may retain wall 108 on surface 126. Spline 1221 may retain dowel 148 (not shown) against surface 126. Retainer 1218 may retain wall 108 on surface 126 through a downward force. Retainer 1218 may retain wall 108 on surface 126 through a friction force. Spline 1221 may retain wall 108 on surface 126 through a downward force. Spline 1221 may retain wall 108 on surface 126 through a friction force.

Retainer 1218 may be adjusted by sliding anchor 122 (not shown). Retainer 1218 may be adjusted by tightening or loosening nut 140 (not shown).

Figure 13:
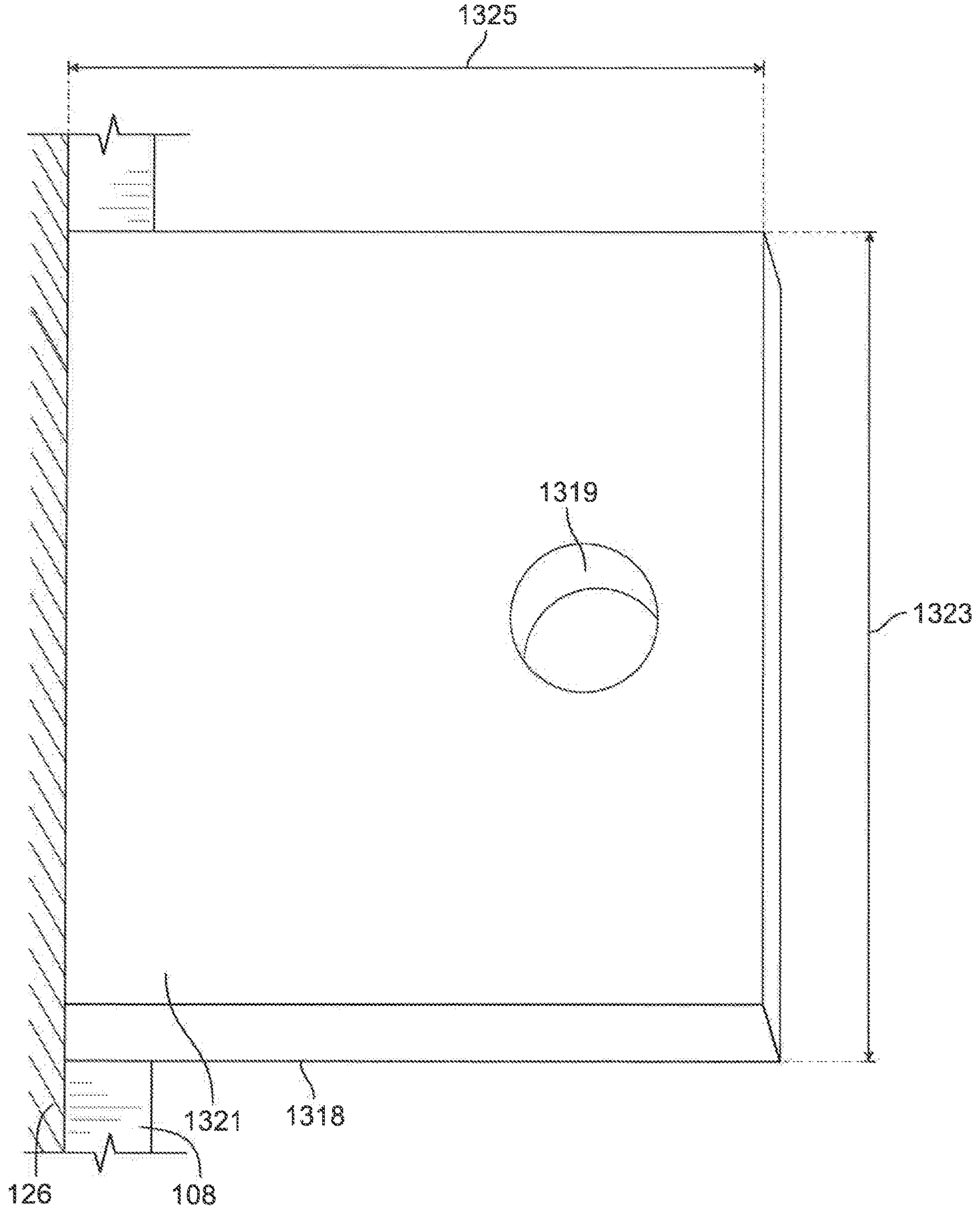
FIG. 13 shows illustrative apparatus in accordance with principles of the invention.

FIG. 13 shows atop perspective of retainer 1318. Retainer 1318 may include one or more features in common with retainers 1218 and 118. Retainer 1318 may have a length 1323 (measured between references lines) that is greater than its width 1325 (measured from reference lines). Retainer 1318 may include a projection/spline 1321 and a hole 1319. Extension 120 (not shown) may extend through hole 1319 from anchor 122 (not shown) and be held onto retainer 1318 through a nut 140 (not shown). A washer (not shown) may also be used to hold extension 120. Spline 1321 may retain wall 108 on surface 126. Spline 1321 may retain dowel 148 (not shown) against surface 126. Retainer 1318 may retain wall 108 on surface 126 through a downward force. Retainer 1318 may retain wall 108 on surface 126 through a friction force. Spline 1321 may retain wall 108 on surface 126 through a downward force. Spline 1321 may retain wall 108 on surface 126 through a friction force. The extended length of retainer 1318 may increase the amount of force.

Retainer 1318 may be adjusted by sliding anchor 122 (not shown). Retainer 1318 may be adjusted by tightening or loosening nut 140 (not shown). The extended length of retainer 1318 may decrease the amount of adjusting necessary to retain the wall 108 on surface 126.

Figure 14:
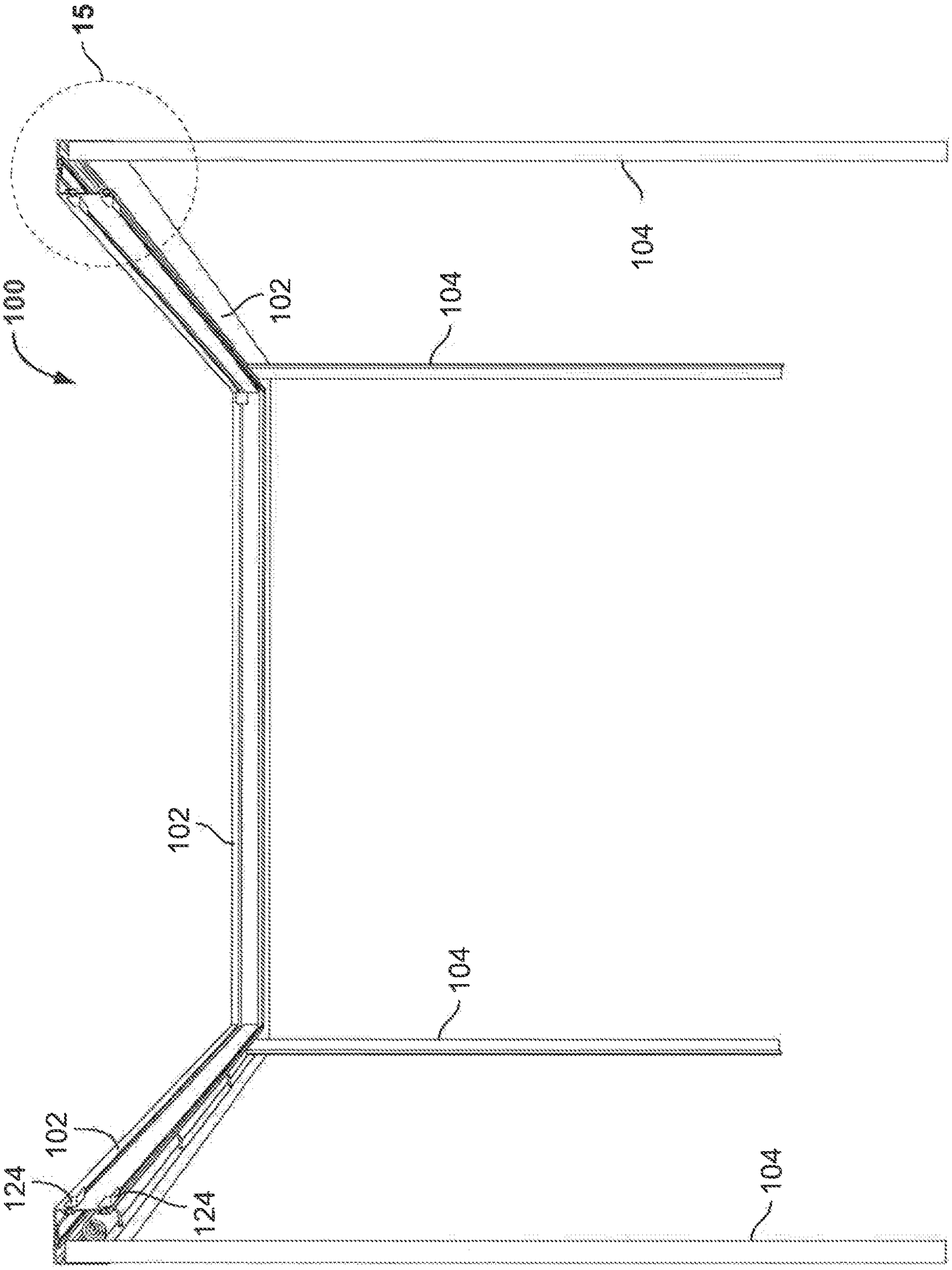
FIG. 14 shows illustrative apparatus in accordance with principles of the invention.

FIG. 14 shows apparatus 100 in accordance with principles of the invention. Apparatus 100 may be an assembled shelter, with walls 108 in a stored position inside channels 102. Apparatus 100 may include vertical supports 104. Each vertical support 104 may support one or two channels 102. Vertical support 104 may be located at an end of channel 102. Partial view "15" is shown in detail in FIG. 15.

Figure 15:
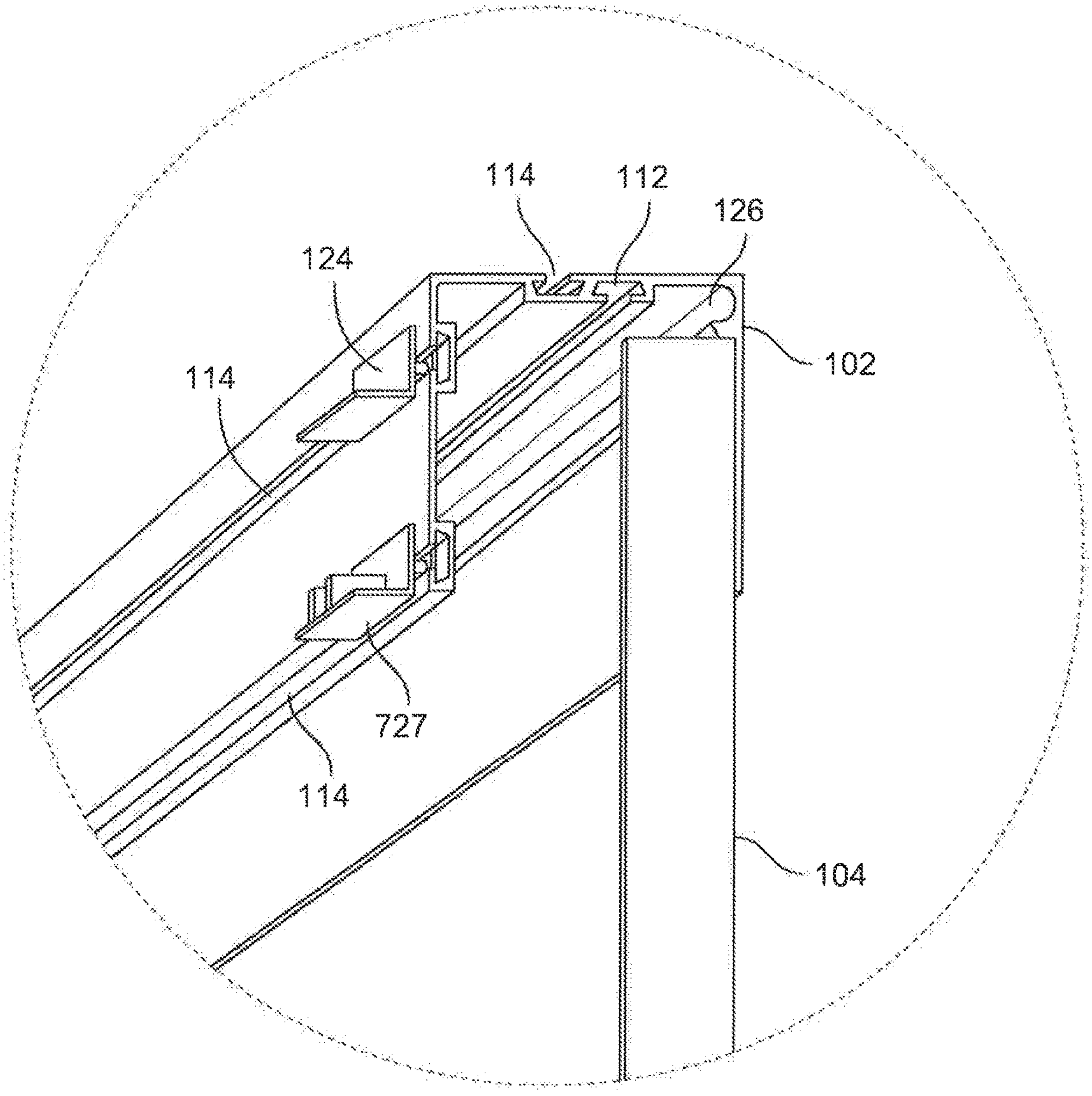
FIG. 15 is partial view "15" identified approximately in FIG. 14.

FIG. 15 shows partial view "15" approximately identified in FIG. 14. Channel 102 may include exterior slots 114, interior slot 112, and surface 126. Other elements, such as, inter alia, wall 108, guides 116, retainers 118, and lines 110 are not shown. Brackets 124 may be supported in exterior slots 114. Brackets 727 may be supported in exterior slots 114. Other items (not shown) may be supported in exterior slots 114. Channel 102 may be supported by vertical support 104. Vertical support 104 may have a square cross-section. Vertical support 104 may have an angled cross-section. Vertical support 104 may have a rectangular cross-section. Vertical support 104 may have circular cross section. Vertical support 104 may have a "T"-shaped cross-section.

Figure 16:
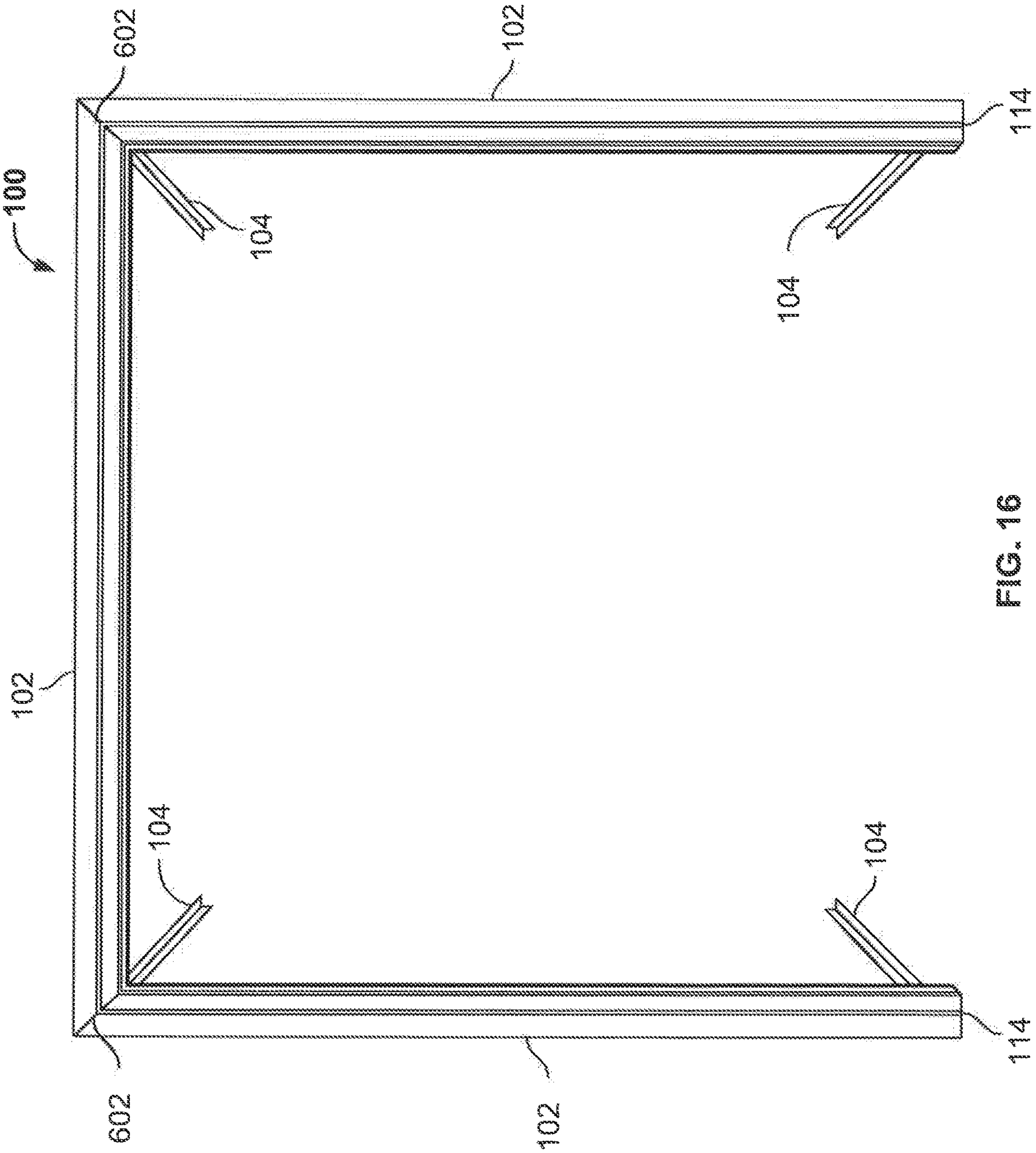
FIG. 16 shows illustrative apparatus in accordance with principles of the invention.

FIG. 16 shows a top view of apparatus 100 from a different perspective than that shown in FIG. 14 and FIG. 6. Channels 102 may be supported by vertical supports 104 and may include exterior slots 114. Channels 102 may include a mitered end 602. Mitered end 602 may allow multiple channels 102 to be placed next to each other with a tidy fit with minimal overlap. Different miter angles may allow for different shelter structure shapes, such as, inter alia, a pentagon, hexagon, octagon, or a triangle, instead of a rectangle or square.

Figure 17:
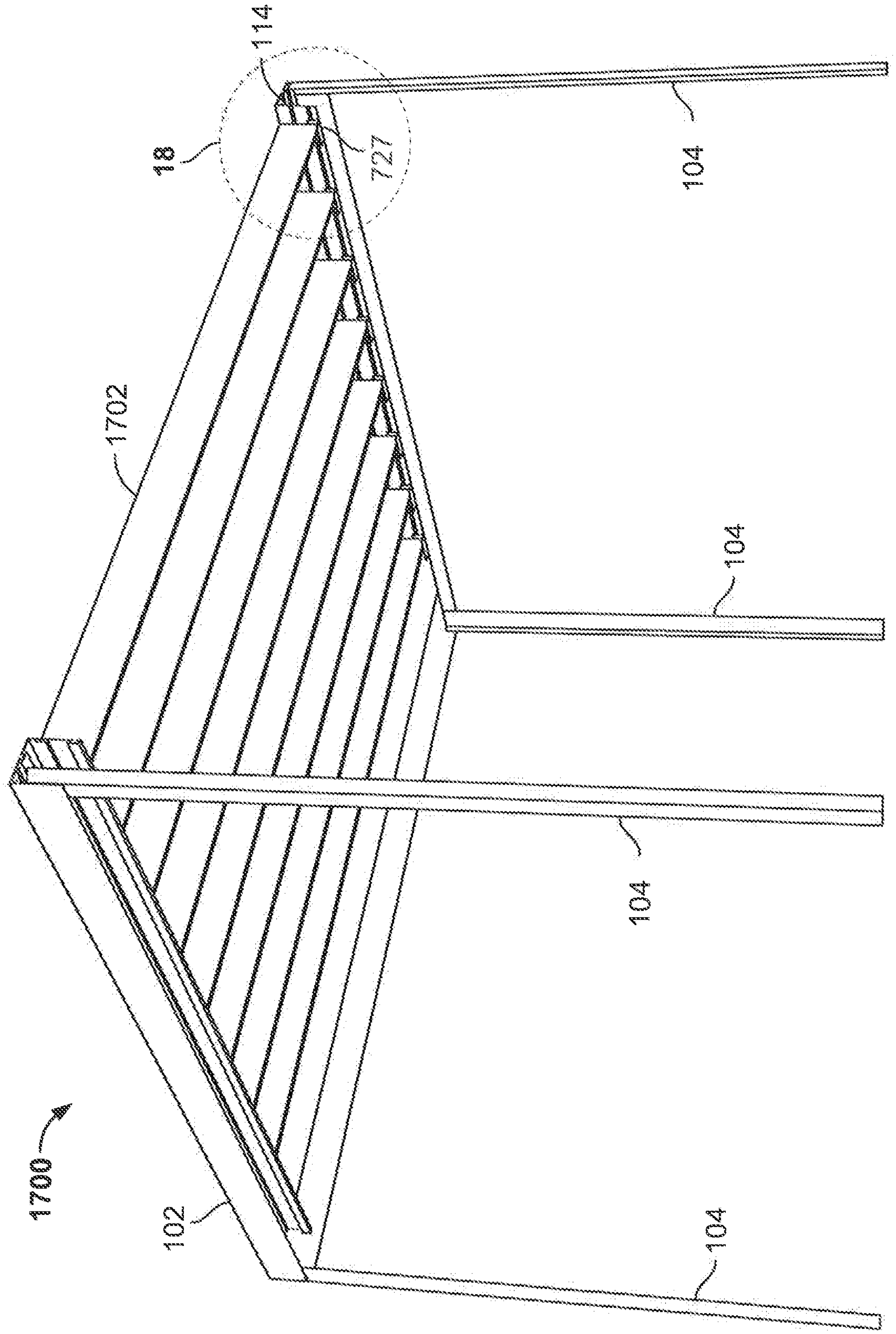
FIG. 17 shows illustrative apparatus in accordance with principles of the invention.

FIG. 17 shows illustrative apparatus 1700. The apparatus may include one or more features in common with the apparatus or features shown in FIGS. 1-16. Apparatus 1700 may include channels 102, supports 104, and roof beams 1702. Roof beams 1702 may form a pergola roof. Roof beams 1702 may be rafters. Roof beams 1702 may be roof supports. A roof (not shown) may be supported by beams 1702. Beams 1702 may be supported by brackets 124 (not shown). Brackets 124 may be supported by exterior slots 114 on channels 102. Beams 1702 may be supported by brackets 727. Brackets 727 may be supported by exterior slots 114. Beams 1702 may have the same dimension as the width of panel 105. Beams 1702 may be shorter or longer than the width of panel 105.

Multiple roof beams 1702 may be installed on brackets 124 or brackets 727. Brackets 727 may provide more support than brackets 124. The more roof beams 1702 installed, the more support may be provided to a roof Increasing the number of roof beams 1702 may increase the amount of shade provided when forming a pergola roof. Partial view "18" is shown in FIG. 18.

Beams 1702 may include shelves (not shown) on the bottom of each beam. The shelves may be configured to support an item. When supports 104 are of differing lengths or placed on uneven ground, roof beams 1702 may be angled.

Figure 18:
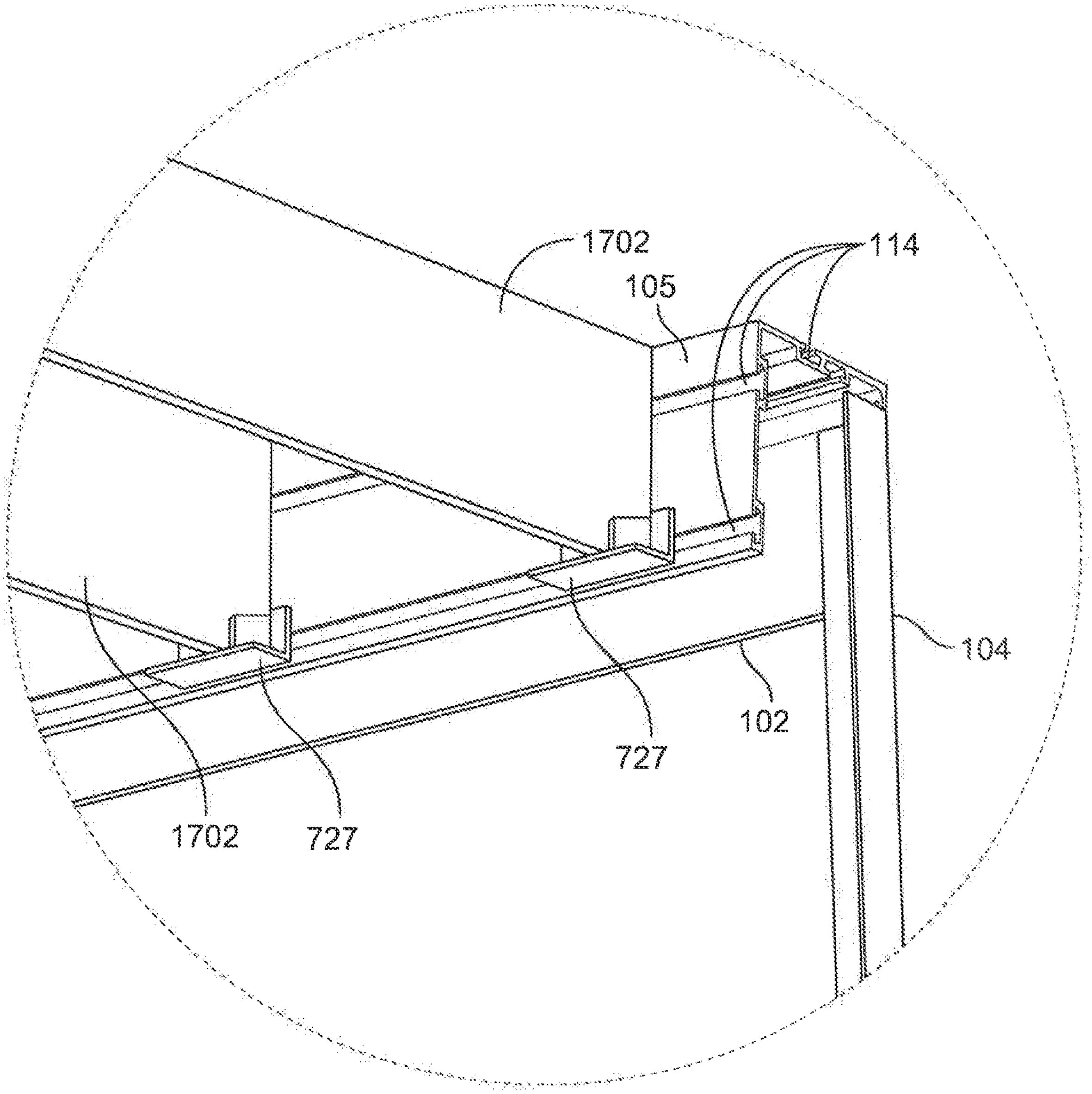
FIG. 18 is partial view "18" identified approximately in FIG. 17.

FIG. 18 shows partial view "18" approximately identified in FIG. 17. Channel 102 may be supported by vertical support 104. Channel 102 may include exterior slots 114. Exterior slots 114 may support brackets 727. Brackets 727 may support roof beams 1702. Beams 1702 may have the same dimension as the width of panel 105. Beams 1702 may be shorter or longer than the width of panel 105.

Figure 19:
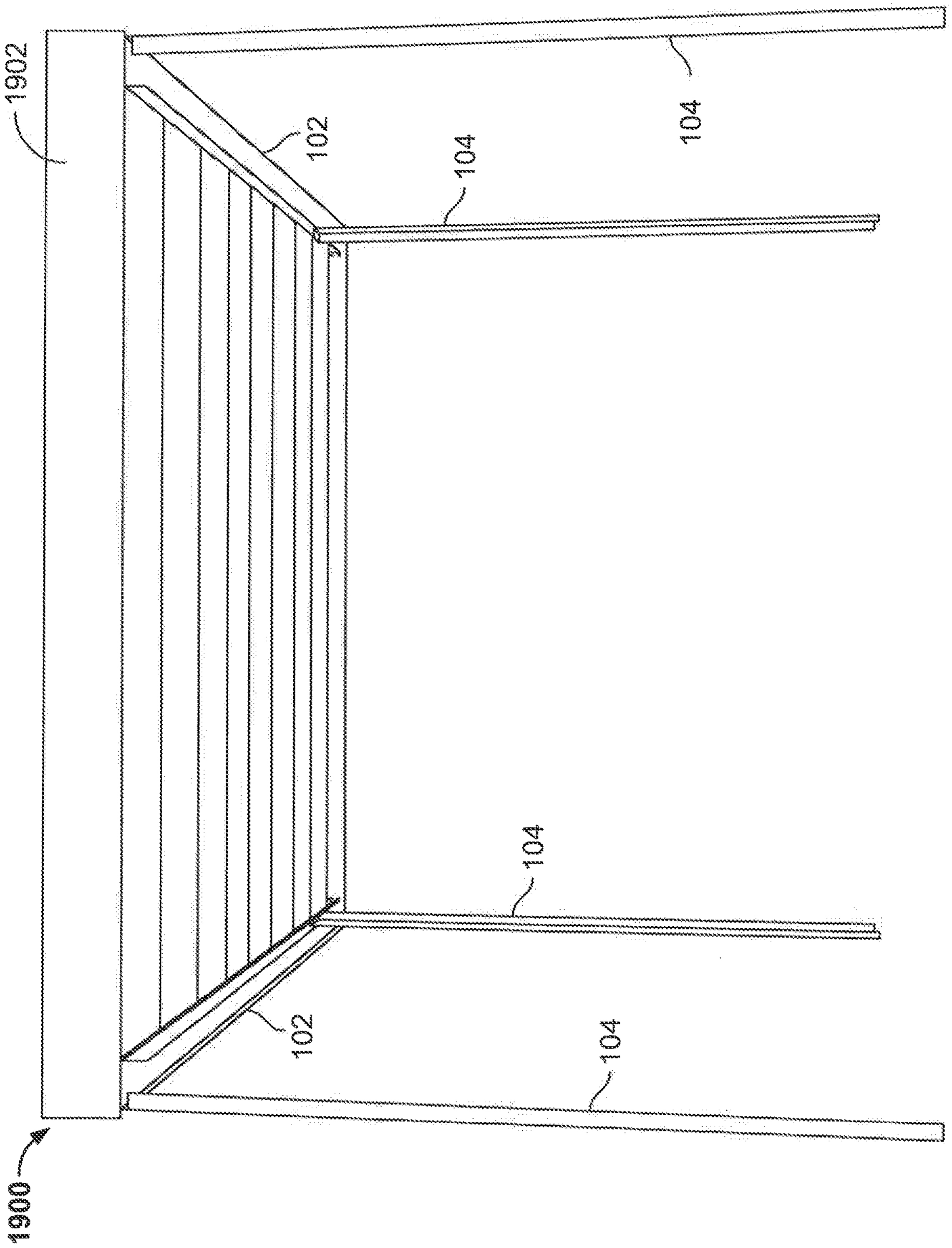
FIG. 19 shows illustrative apparatus in accordance with principles of the invention.

FIG. 19 shows illustrative apparatus 1900. The apparatus may include one or more features in common with the apparatus or features shown in FIGS. 1-18. Roof beams 1902 may be located on top of channels 102. Roof beams 1902 may be supported by brackets (not shown) supported by exterior slots 114 (not shown) on top of channels 102. Roof beams 1902 may extend past the edge of channels 102. Roof beams 1902 may form a pergola roof. Roof beams 1902 may be rafters. Roof beams 1902 may be roof supports. A roof (not shown) may be supported by beams 1902. Beams 1902 may be supported by brackets. Beams 1902 may be supported by brackets 727 (not shown). Brackets 727 (not shown) may be supported by exterior slots 114 (not shown) on panel 103 (not shown) of channels 102.

When supports 104 are of differing lengths or placed on uneven ground, roof beams 1902 may be angled. When beams 1902 are supported by brackets of different sizes or lengths, the roof beams 1902 may be angled.

Figure 20:
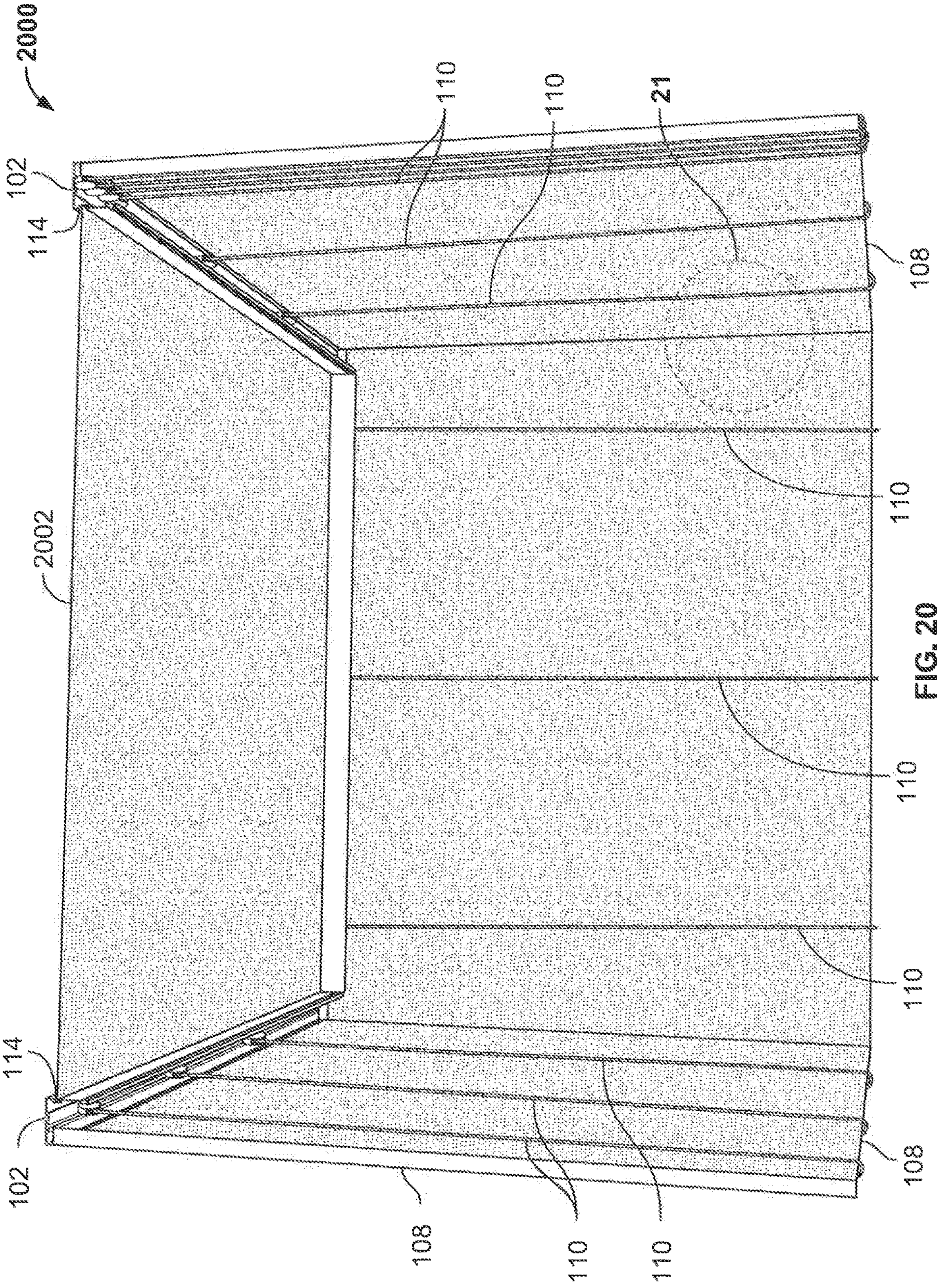
FIG. 20 shows illustrative apparatus in accordance with principles of the invention.

FIG. 20 shows illustrative apparatus 2000. The apparatus may include one or more features in common with the apparatus or features shown in FIGS. 1-19. Apparatus 2000 may include channels 102 and supports 104 (not shown). Supports 104 may support channels 102 and hold channels 102 above the ground. Supports 104 may be perpendicular to channels 102.

Walls 108 are shown extended outside of channels 102. Lines 110 are shown extended around walls 108.

Apparatus 2000 may include a roof 2002 extending between channels 102. Roof 2002 may include a ceiling. Roof 2002 may be supported by roof supports (not shown). Roof 2002 may extend from exterior slots 114 on channels 102. Roof 2002 may be supported by exterior slots 114. Roof 2002 may be stretched from one channel 102 to another channel 102. Roof 2002 may be tensioned. Roof 2002 may include a drainage system (not shown), Extending walls 108 and installing a roof 2002 may form a shelter apparatus 2000. Additional walls 108 and shapes other than square or rectangle may be used to form a shelter apparatus 2000. Partial view "21" is shown in FIG. 21.

Figure 21:
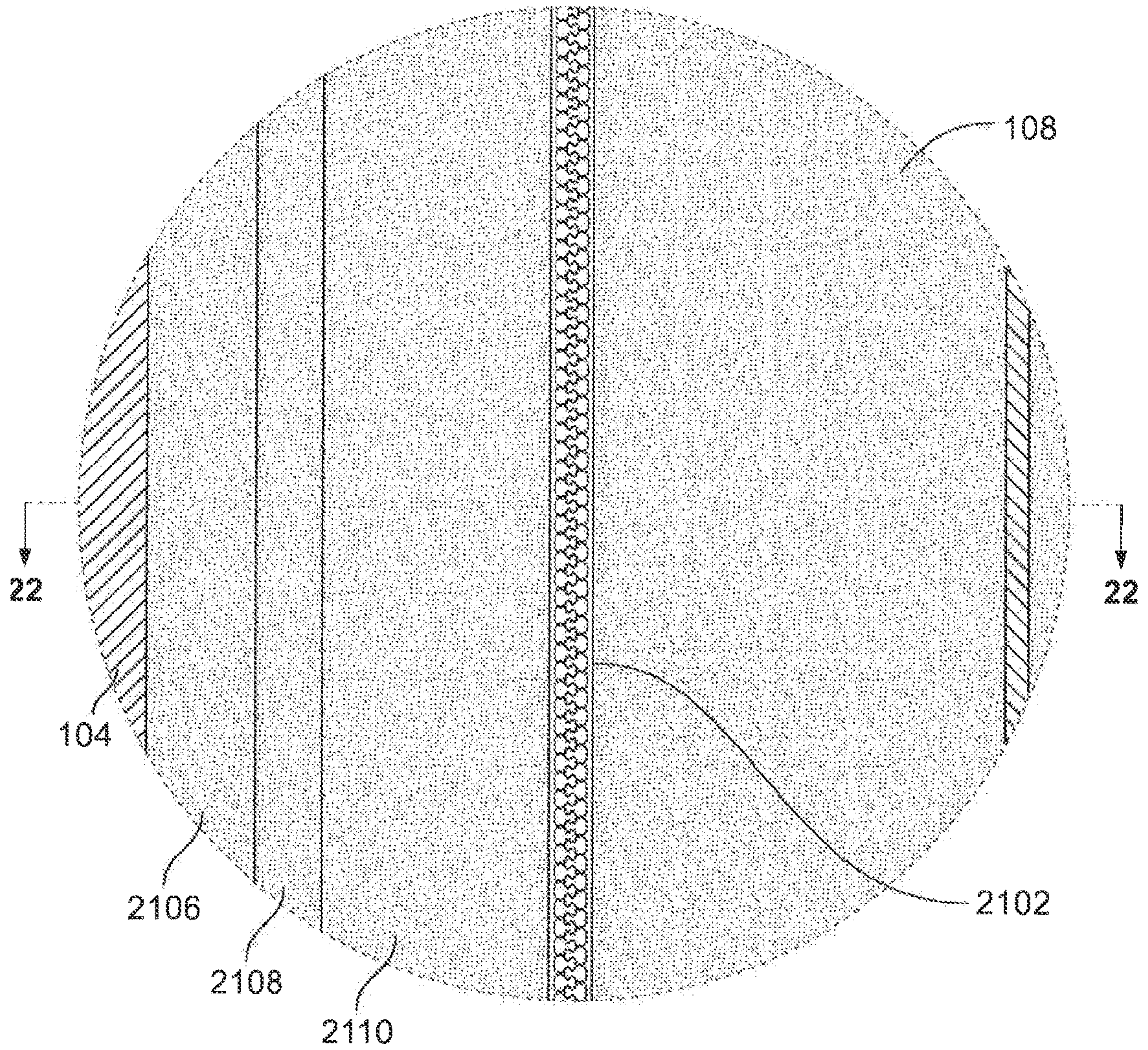
FIG. 21 is partial view "21" identified approximately in FIG. 20.

FIG. 21 shows partial view "21" approximately identified in FIG. 20. Zipper 2102 may join two or more walls 108 together. Zipper 2102 may join wall 108 with zipper tape 2110. Other suitable apparatus (e.g., Velcro) may be used to join two or more walls 108 together. Zipper 2102 may be weather-resistant. Zipper 2102 may be waterproof. Zipper 2102 may be water-resistant. Zipper 2102 may form an airtight seal. Zipper 2102 may form a biohazard safety seal.

Zipper tape 2110 may be supported by sleeve 2108. Sleeve 2108 may be joined to support 104 with wall 2106. Sleeve 2108 and wall 2106 may form a keder. The keder may be joined with support 104 by welding. The keder may be joined with support 104 by a screw. The keder may be joined with support 104 by a bolt. The keder may be joined with support 104 by a magnet. The keder may be joined with support 104 by glue. The keder may be joined to support 104 by any suitable method or combination of methods. The keder may extend along the length of support 104. FIG. 21 includes view line 22 as a cross-sectional view of the apparatus shown in FIG. 21.

Figure 22:
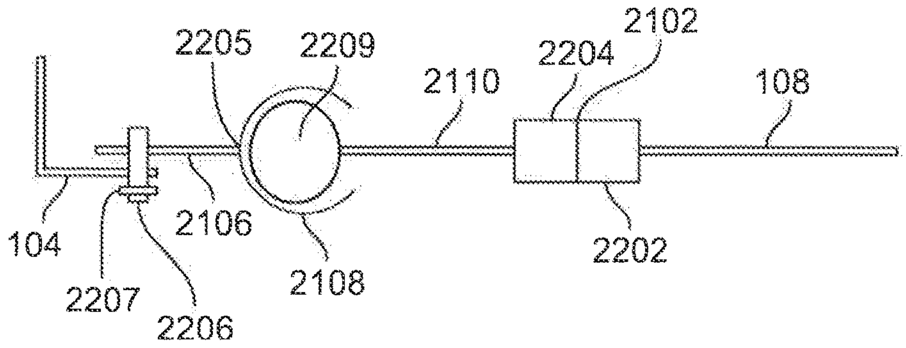
FIG. 22 is a cross-section view of the apparatus shown in FIG. 21 identified approximately along the line 22.

FIG. 22 is a cross-section view of the apparatus shown in FIG. 21 along the line 22. A wall 108 may include one half 2202 of a zipper 2102 that may be joined with the other half 2204. Second half 2204 of zipper 2102 may be joined to zipper tape 2110. Zipper tape 2110 may include a dowel 2209. Dowel 2209 may be inserted into sleeve 2108 of keder 2205. Keder 2205 may be joined with support 104 through a bolt 2206 and nut 2207. The keder 2205 may be joined with support 104 by welding. The keder 2205 may be joined with support 104 by a screw. The keder 2205 may be joined with support 104 by a magnet. The keder 2205 may be joined with support 104 by glue. The keder 2205 may be joined to support 104 by any suitable method or combination of methods. The keder 2205 may extend along the length of support 104.

Keder 2205 may include of one of the following: natural fibers, synthetic fibers, plastic, wood, metal, any other suitable material, or a combination thereof. Dowel 2209 may be configured to slide into sleeve 2108.

Figure 23:
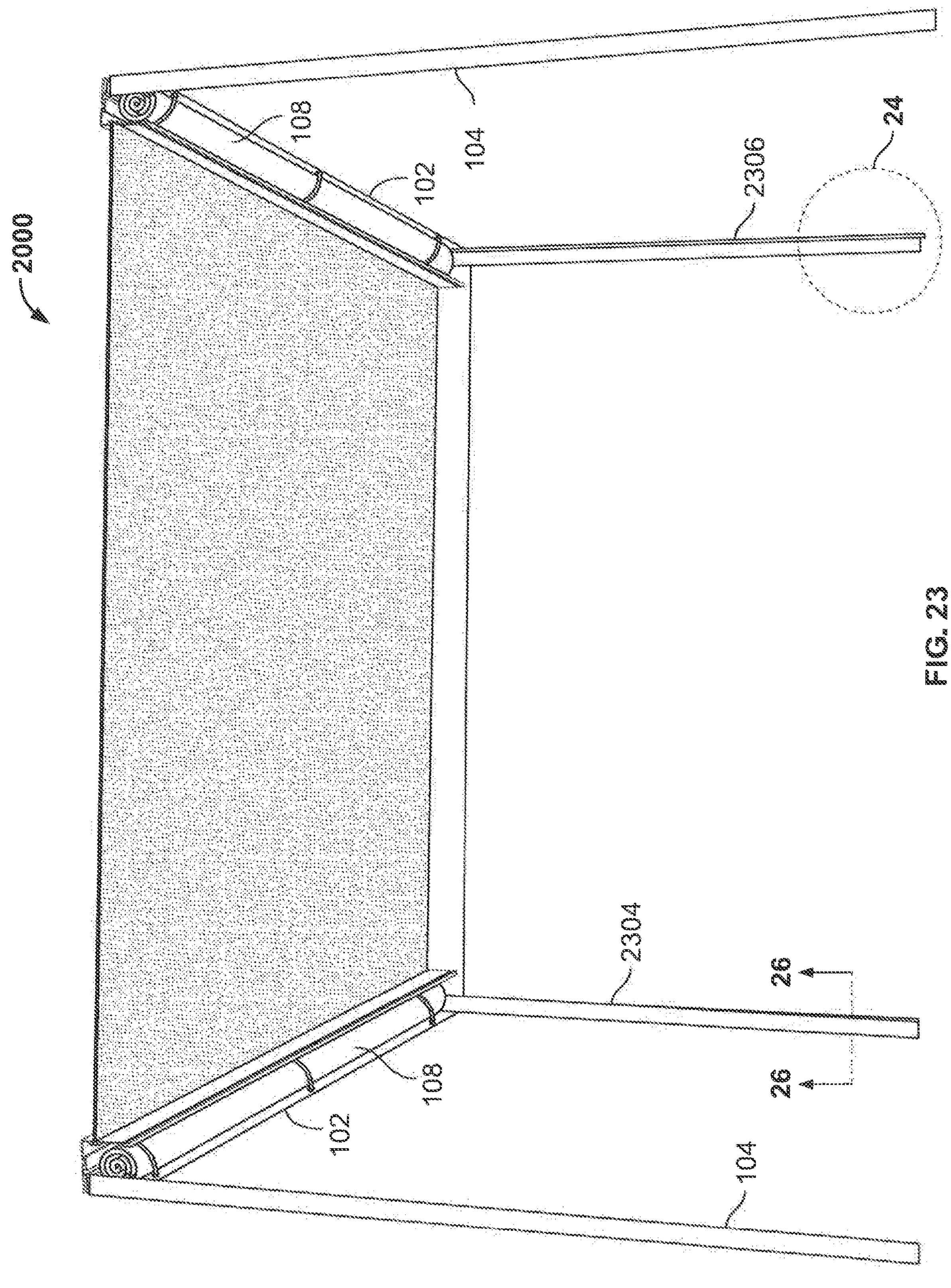
FIG. 23 shows illustrative apparatus in accordance with principles of the invention.
Figure 24:
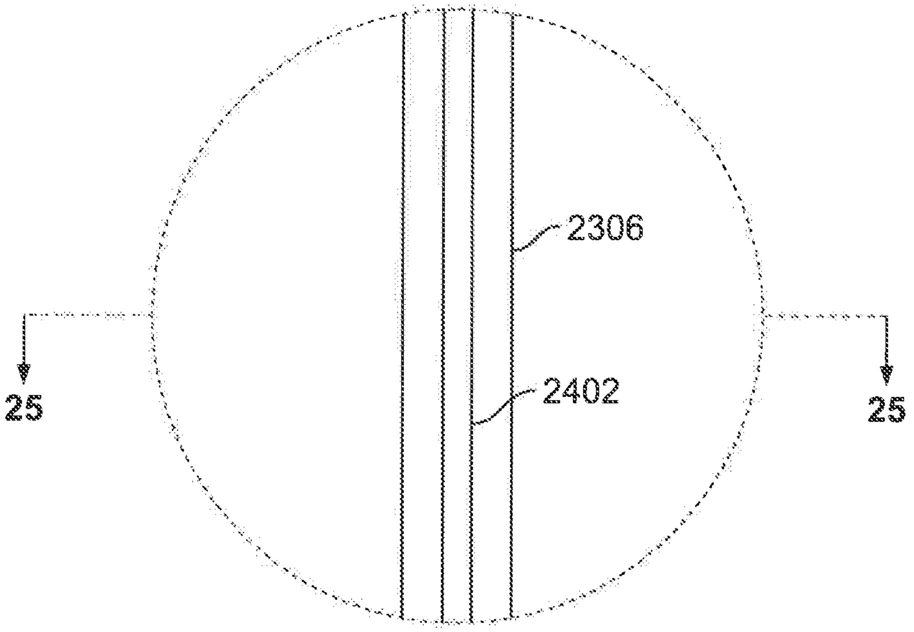
FIG. 24 is partial view "24" identified approximately in FIG. 23.
Figure 26:
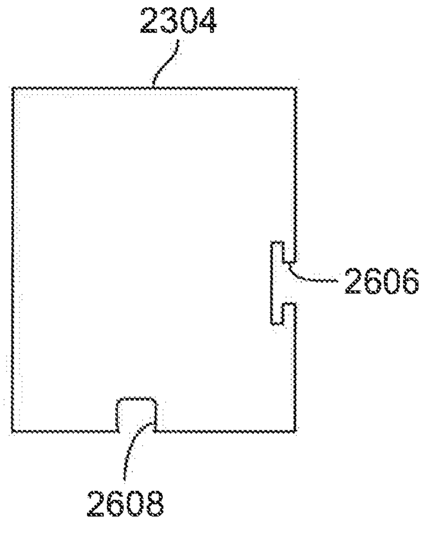
FIG. 26 is a cross section of the apparatus shown in FIG. 23 along the line 26.

FIG. 23 shows apparatus 2000 in a different arrangement than that shown in FIG. 20. The apparatus may include one or more features in common with the apparatus or features shown in FIGS. 1-22. FIG. 23 shows apparatus 2000 with walls 108 stored inside channels 102. Channels 102 may be supported by supports 104, supports 2306, or supports 2304. Partial view "24" is shown in FIG. 24. Cross-sectional view "26" is shown in FIG. 26.

FIG. 24 shows partial view "24" approximately identified in FIG. 23. Channel 102 may be supported by vertical support 2306. Support 2306 may include a slot 2402. Cross-sectional view "25" is shown in FIG. 25.

Figure 25:
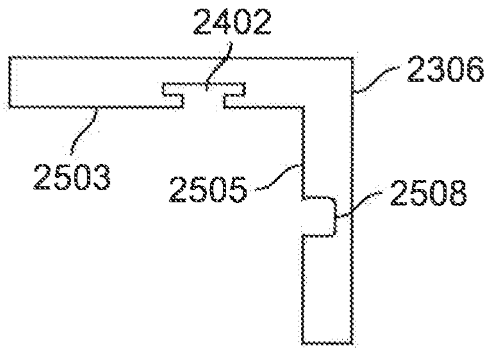
FIG. 25 is a cross section of the apparatus shown in FIG. 24 along the line 25.

FIG. 25 shows a cross-sectional view of support 2306 identified approximately along the line "25" in FIG. 24. Support 2306 may include a panel 2505. Support 2306 may include a panel 2503. Support 2306 may include a right angle formed from panel 2505 and panel 2503. Panel 2503 may include slot 2402. Slot 2402 may be a "T"-slot. Slot 2402 may have a circular cross-section. Slot 2402 may have a rectangular cross-section. Slot 2402 may have a different cross-section. Slot 2402 may be configured to support a wall. The wall may be wall 108 (not shown) as shown in FIG. 21. Slot 2402 may be configured to support a keder, such as keder 2205 shown in FIG. 22. An item, such as a wall or keder, may be configured to slide in and out of slot 2402.

Support 2306 may include a slot 2508 on panel 2505. Slot 2505 may be a "T"-slot. Slot 2505 may have a circular cross-section. Slot 2505 may have a rectangular cross-section. Slot 2505 may have a different cross-section. Slot 2505 may be configured to support a wall. The wall may be wall 108 (not shown) as shown in FIG. 21. Slot 2505 may be configured to support a keder, such as keder 2205 shown in FIG. 22. An item, such as a wall or keder, may be configured to slide in and out of slot 2505.

Slots 2505 and 2508 may include one or more features shown in FIGS. 1-24.

FIG. 26 shows a cross-sectional view of support 2304 identified approximately along the line "26" in FIG. 23. Support 2304 may have a rectangular cross-section. Support 2304 may have a square cross-section. Support 2304 may have a circular cross-section. Support 2304 may include slot 2606 and slot 2608. Slot 2606 may be a "T"-slot. Support 2304 may include additional slots (not shown). Slot 2606 may have a circular cross-section. Slot 2606 may have a rectangular cross-section. Slot 2606 may have a different cross-section. Slot 2606 may be configured to support a wall. The wall may be wall 108 (not shown) as shown in FIG. 21. Slot 2606 may be configured to support a keder, such as keder 2205 shown in FIG. 22. An item, such as a wall or keder, may be configured to slide in and out of slot 2606.

Slot 2608 may be on a different side of support 2304 than slot 2606. Slot 2608 may be a "T"-slot. Slot 2608 may have a circular cross-section. Slot 2608 may have a rectangular cross-section. Slot 2608 may have a different cross-section. Slot 2608 may be configured to support a wall. The wall may be wall 108 (not shown) as shown in FIG. 21. Slot 2608 may be configured to support a keder, such as keder 2205 shown in FIG. 22. An item, such as a wall or keder, may be configured to slide in and out of slot 2608.

Slots 2608 and 2606 may include one or more features shown in FIGS. 1-25.

Figure 27:
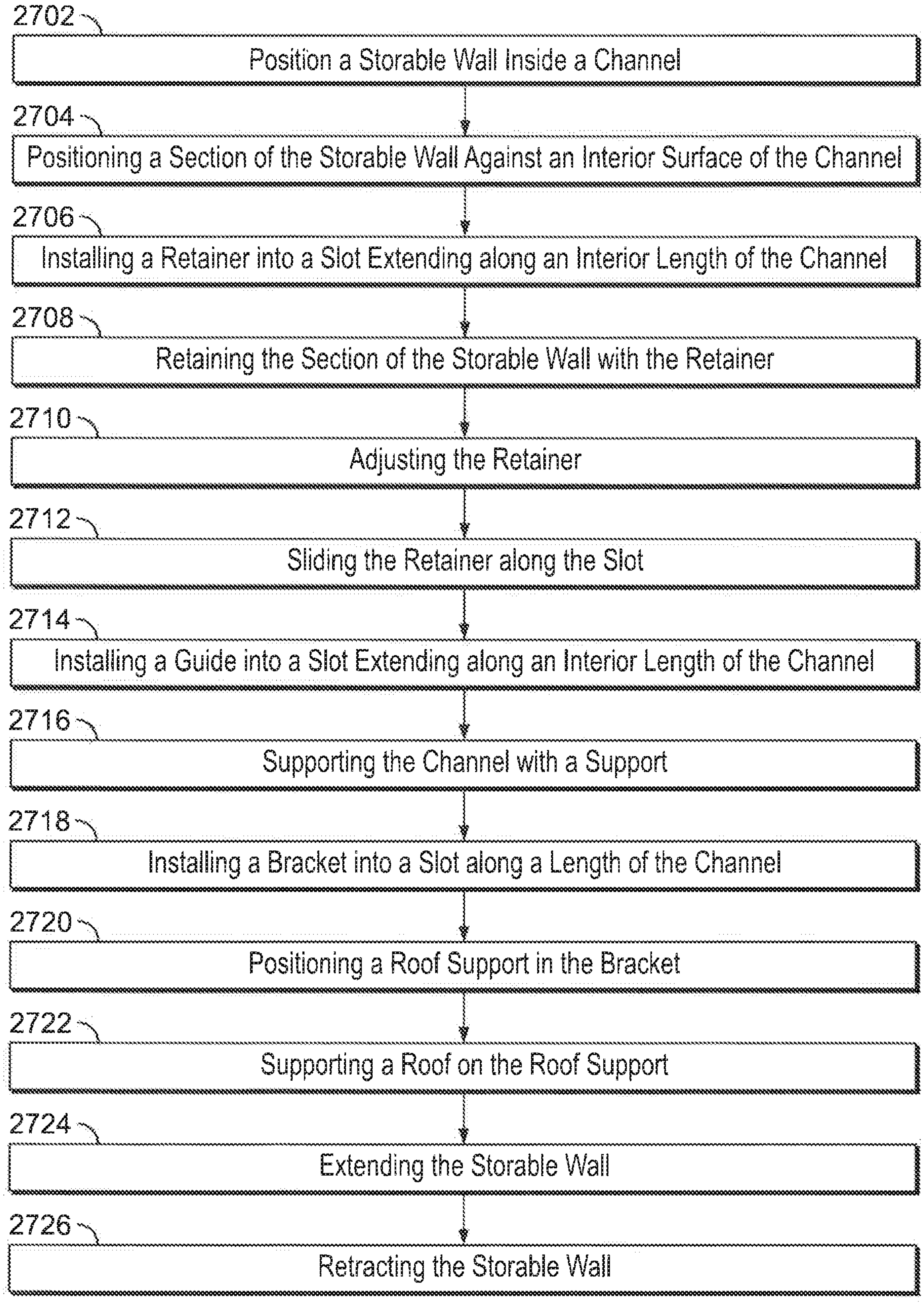
FIG. 27 shows illustrative flowchart in accordance with principles of the invention.

FIG. 27 shows an illustrative flowchart in accordance with principles of the invention. Methods may include some or all of the method steps numbered 2702 through 2726. Methods may include the steps illustrated in FIG. 27 in an order different from the illustrated order. The illustrative method shown in FIG. 27 may include one or more steps performed in other figures or described herein. Steps 2702 through 2726 may be performed on the apparatus shown in FIGS. 1-26 or other apparatus.

At step 2702, a wall may be positioned inside a channel. At step 2704, a section of the wall may be positioned against an interior surface of the channel.

At step 2706 a retainer may be installed into a slot extending along a length of the channel in the interior, and at step 2708, the section of the wall may be retained against the surface with the retainer.

At step 2710 the retainer may be adjusted and at step 2712 the retainer may be slid along the slot, if necessary. At step 2714, a guide may be installed into a slot extending along a length of the channel in the interior. A line may be installed with the guide. The line may support the wall and may raise or lower the wall. Multiple guides and multiple lines may be installed, as necessary.

At step 2716, the channel may be supported by a support. The support may raise the channel off of the ground or other surface.

At step 2718, a bracket may be installed into a slot extending along a length of the channel on the exterior of the channel. At step 2720 a roof support may be positioned in the bracket. At step 2722, a roof may be supported on the roof support.

At step 2724, the wall may be extended. At step 2726, the wall may be retracted.

Thus, apparatus and methods for shelter are provided. Persons skilled in the art will appreciate that the present invention can be practiced by other than the described embodiments, which are presented for purposes of illustration rather than of limitation.

What is claimed is:

1. Apparatus comprising:
- a flexible wall;
- one or more retainers configured to retain a portion of the flexible wall; and
- a channel comprising a length in a longitudinal direction that defines:
  - an interior comprising at least one interior surface and configured to store the flexible wall along a portion of the length;
  - a first slot that:
    - extends along the length of the channel in the interior; and
    - is configured to receive the one or more retainers that retain a portion of the flexible wall against the interior surface of the channel; and
  - a second slot that extends along the length of the channel on an exterior surface of the channel; and wherein:
- the interior surface includes a retaining lip that extends into the interior and is configured to receive the portion of the flexible wall;
- the retainer includes a dowel and the first slot is configured to receive the dowel; and
- the flexible wall is:
  - furlable;
  - rollable;
  - retractable;
  - storable; or
  - foldable.

2. The apparatus of claim 1 wherein the first slot is configured to slidably support the retainer.

3. The apparatus of claim 1 further comprising:
a spool;
an end plate; and
a spool bracket;
wherein:
the end plate is disposed transversely adjacent an end of the channel;
the end plate supports the spool bracket;
the spool bracket supports the spool; and
the spool is configured to retain the wall.

4. The apparatus of claim 1 wherein the wall is retractable without a spool.

5. The apparatus of claim 1 wherein the dowel is fixed to the wall at a location inside the slot such that the dowel retains the wall against a force urging the wall to be withdrawn from the slot.

6. The apparatus of claim 5 wherein the force is a force that causes the dowel to press the wall against the surface.

7. The apparatus of claim 1 wherein the dowel extends along the first slot.

8. The apparatus of claim 1 wherein the retainer includes:
an anchor that is configured to engage the first slot; and
an extension that is configured to extend out of the first slot when the anchor is engaged in the first slot.

9. The apparatus of claim 8 further comprising a projection; wherein the projection is:
supported by the extension; and
is configured to be oriented in a position in which the projection retains the wall against the surface.

10. The apparatus of claim 9 wherein:
the retainer is a first retainer; and
the projection extends from the first retainer to a second retainer that is disposed in the first slot.

11. The apparatus of claim 8 wherein the anchor is slidable along the first slot.

12. The apparatus of claim 8 wherein the extension is a bolt.

13. The apparatus of claim 9 wherein the projection is circular.

14. The apparatus of claim 8 wherein the anchor is circular.

15. The apparatus of claim 8 wherein the anchor is a nut.

16. The apparatus of claim 8 wherein the anchor further comprises a washer.

17. The apparatus of claim 9 wherein the projection extends along a length of the first slot.

18. The apparatus of claim 8 wherein the anchor extends along a length of the first slot.

19. The apparatus of claim 9 wherein the projection extends along a length of the first slot greater than a width of the projection.

20. The apparatus of claim 1 further including wherein:
the channel includes a panel; and
the surface extends into the interior away from the panel.

21. The apparatus of claim 20 wherein:
the channel defines a longitudinal direction; and
the surface extends along the longitudinal direction.

22. The apparatus of claim 1 wherein:
the channel includes a panel; and
the surface is recessed into the panel.

23. The apparatus of claim 1 wherein the surface is inside the slot.

24. The apparatus of claim 20 wherein the surface is curved.

25. The apparatus of claim 20 wherein the surface is angled.

26. The apparatus of claim 1 wherein the channel is "U"-shaped.

27. The apparatus of claim 1 wherein the channel is "C"-shaped.

28. The apparatus of claim 1 wherein the slot is a "T"-slot.

29. The apparatus of claim 1 wherein, in a cross-section perpendicular to the channel, the slot has a curved cross-section.

30. The apparatus of claim 1 wherein the channel includes:
a first panel;
a second panel; and
a third panel;
and the first panel is perpendicular to the second panel.

31. The apparatus of claim 1 wherein the channel:
includes an exterior face; and
defines a longitudinal direction; and,
when the slot is a first slot, defines a second slot that extends along the exterior face in the longitudinal direction.

32. The apparatus of claim 1 wherein the channel:
defines a longitudinal direction; and,
when the slot is a first slot, defines a second slot that extends interior the channel in the longitudinal direction.

33. The apparatus of claim 32 further comprising a guide that is configured to be slid in and anchored in the second slot.

34. The apparatus of claim 33 further comprising, when the guide is a first guide, a second guide that is configured to be slid in and anchored in the second slot.

35. The apparatus of claim 34 wherein the first guide comprises a sheave.

36. The apparatus of claim 35 further comprising a line that:
has an end fixed to the channel; and
runs:
around the wall; and
through:
the first guide; and
the second guide.

37. The apparatus of claim 36 wherein the channel defines a hole at which the line may be fixed by a stop knot on one side of the hole.

38. The apparatus of claim 36 further comprising, when the line is a first line, a second line that:
has an end fixed to the channel; and
runs:
around the wall; and
through:
the first guide; and
a third guide in the second slot.

39. The apparatus of claim 36 further comprising a third line that:
has an end fixed to the channel; and
runs:
around the wall; and
through:
the first guide; and
a fourth guide in the second slot.

40. The apparatus of claim 39 wherein the first guide includes:
a first sheave through which runs the first line;
a second sheave through which runs the second line; and
a third sheave through which runs the third line.

41. The apparatus of claim 1 further comprising a second slot that:

extends along a length of the channel in the interior; and is configured to support an accessory.

42. The apparatus of claim 41 wherein the accessory includes a light.

43. The apparatus of claim 41 wherein the accessory includes a power cord.

44. The apparatus of claim 41 wherein the accessory includes an air conditioner.

45. The apparatus of claim 41 wherein the accessory includes a fan.

46. The apparatus of claim 41 wherein the accessory includes a heater.

47. The apparatus of claim 1 further comprising a second slot that:

extends along a length of the channel on an exterior of the channel; and is configured to support an accessory.

48. The apparatus of claim 47 wherein the accessory includes a light.

49. The apparatus of claim 48 wherein the light is an LED.

50. The apparatus of claim 47 wherein the accessory includes a power cord.

51. The apparatus of claim 47 wherein the accessory includes an air conditioner.

52. The apparatus of claim 47 wherein the accessory includes a fan.

53. The apparatus of claim 47 wherein the accessory includes a heater.

54. The apparatus of claim 1 wherein the interior is configured to store the wall when it is furled.

55. The apparatus of claim 1 further comprising a snap-on cover configured to enclose one end of the channel.

56. The apparatus of claim 1 further comprising a hinged cover configured to enclose one end of the channel.

57. The apparatus of claim 1 further comprising a hinged cover configured to enclose the interior.

58. The apparatus of claim 1 further comprising a removable cover configured to enclose the interior.

59. The apparatus of claim 1 wherein the channel is formed via extrusion.

60. The apparatus of claim 1 wherein the channel includes sheet metal.

61. The apparatus of claim 1 wherein the channel further comprises a first end and a second end.

62. The apparatus of claim 61 wherein the first end is mitered.

63. The apparatus of claim 61 wherein both the first end and the second end are mitered.

64. The apparatus of claim 1 further comprising an additional slot that extends along the channel on an exterior of the channel.

65. The apparatus of claim 64 wherein the additional slot is configured to support a bracket.

66. The apparatus of claim 65 wherein the bracket is configured to support a rafter.

67. The apparatus of claim 66 wherein the rafter is a pergola beam.

68. The apparatus of claim 65 wherein the bracket is configured to support a ceiling.

69. The apparatus of claim 64 wherein the additional slot is configured to support a ceiling.

70. The apparatus of claim 69 wherein the ceiling is comprised of a plastic material.

71. The apparatus of claim 69 wherein the ceiling is comprised of a fabric material.

72. The apparatus of claim 1 wherein the wall is comprised of a fabric material.

73. The apparatus of claim 1 wherein the wall is comprised of a plastic material.

74. The apparatus of claim 1 wherein the wall further comprises a zipper along an edge of the wall.

75. The apparatus of claim 74 wherein the wall is configured to be zippered to a second wall.

76. The apparatus of claim 74 wherein the zipper is weather-resistant.

77. Apparatus comprising:

a wall;

a retainer;

a channel that defines:

an interior configured to store the wall;

a first slot that:

extends along a length of the channel in the interior; and is configured to receive the retainer that retains a portion of the wall against an interior surface of the channel, said wall configured to retract into the channel;

a second slot that:

extends along a length of the channel in the interior; and is configured to support a guide; and a support configured to support the channel; and wherein:

the interior surface includes a retaining lip that extends into the interior and is configured to receive the portion of the flexible wall;

the retainer includes:

an anchor that is configured to engage the first slot; and an extension that is configured to extend out of the first slot when the anchor is engaged in the first slot;

the extension is a bolt; and the wall is:

furlable;

rollable;

retractable;

storable; or foldable.

78. The apparatus of claim 77 wherein the second slot is configured to slidably support the guide.

79. The apparatus of claim 77 wherein the first slot is configured to slidably support the retainer.

80. The apparatus of claim 77 further comprising a third slot that extends along a length of the channel on an exterior of the channel.

81. The apparatus of claim 80 wherein the third slot is configured to support a roof.

82. The apparatus of claim 81 wherein the roof is furlable.

83. The apparatus of claim 81 wherein the roof is flat.

84. The apparatus of claim 81 wherein the roof is rigid.

85. The apparatus of claim 80 wherein the third slot is configured to support a bracket.

86. The apparatus of claim 82 wherein the roof is furlable into the channel.

87. The apparatus of claim 77 wherein the channel is supported by two or more supports.

88. The apparatus of claim 1 wherein the channel is formed via CNC press braking.

* * * * *